(12) United States Patent
Katou et al.

(10) Patent No.: US 12,065,605 B2
(45) Date of Patent: Aug. 20, 2024

(54) LIQUID CRYSTAL COMPOSITION, DICHROIC MATERIAL, LIGHT ABSORPTION ANISOTROPIC FILM, LAMINATE, AND IMAGE DISPLAY DEVICE

(71) Applicant: FUJIFILM Corporation, Tokyo (JP)

(72) Inventors: Takashi Katou, Kanagawa (JP); Yoshiaki Takada, Kanagawa (JP); Keigo Shiga, Kanagawa (JP); Kengo Saito, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 35 days.

(21) Appl. No.: 17/684,988

(22) Filed: Mar. 2, 2022

(65) Prior Publication Data
US 2022/0186119 A1    Jun. 16, 2022

Related U.S. Application Data

(63) Continuation of application No. PCT/JP2020/031232, filed on Aug. 19, 2020.

(30) Foreign Application Priority Data

Sep. 5, 2019 (JP) ................. 2019-162243

(51) Int. Cl.
G02F 1/1333 (2006.01)
C09K 19/24 (2006.01)
C09K 19/38 (2006.01)
C09K 19/60 (2006.01)

(52) U.S. Cl.
CPC .......... *C09K 19/24* (2013.01); *C09K 19/3852* (2013.01); *C09K 19/601* (2013.01); *C09K 2219/03* (2013.01)

(58) Field of Classification Search
CPC .... C09K 19/24; C09K 19/38; C09K 19/3852; C09K 19/60; C09K 19/601; G02F 1/1333; G02F 1/1335
See application file for complete search history.

(56) References Cited

U.S. PATENT DOCUMENTS

| | | | | |
|---|---|---|---|---|
| 11,022,837 B2 * | 6/2021 | Nishimura | ........ | G02F 1/133528 |
| 11,505,744 B2 * | 11/2022 | Matsuyama | ........... | C09K 19/60 |
| 2015/0062505 A1 | 3/2015 | Hatanaka et al. | | |
| 2018/0355179 A1 | 12/2018 | Chang et al. | | |
| 2019/0382586 A1 | 12/2019 | Katou et al. | | |
| 2020/0018879 A1 * | 1/2020 | Katou | .................. | C09K 19/601 |
| 2022/0186119 A1 * | 6/2022 | Katou | .................... | C09K 19/60 |

FOREIGN PATENT DOCUMENTS

| | | | | |
|---|---|---|---|---|
| JP | 2011-213841 A | 10/2011 | | |
| JP | 2011-237513 A | 11/2011 | | |
| JP | 2019-091088 A | 6/2019 | | |
| JP | 2019-120949 A | 7/2019 | | |
| WO | 2017/043438 A1 | 3/2017 | | |
| WO | 2018/164252 A1 | 9/2018 | | |
| WO | WO-2018186503 A1 * | 10/2018 | ........... | C09K 19/601 |

OTHER PUBLICATIONS

Office Action, issued by the Japanese Patent Office on Feb. 28, 2023, in connection with Japanese Patent Application No. 2021-543684.
International Search Report issued in PCT/JP2020/031232 on Oct. 13, 2020.
Written Opinion issued in PCT/JP2020/031232 on Oct. 13, 2020.
International Preliminary Report on Patentability completed by WIPO on Mar. 8, 2022 in connection with International Patent Application No. PCT/JP2020/031232.
Office Action, issued by the Korean Intellectual Property Office on Jan. 15, 2024, in connection with Korean Patent Application No. 10-2022-7006836.
Office Action, issued by the State Intellectual Property Office of China on Oct. 19, 2023, in connection with Chinese Patent Application No. 202080062202.2.

* cited by examiner

*Primary Examiner* — Geraldina Visconti
(74) *Attorney, Agent, or Firm* — Edwards Neils LLC; Jean C. Edwards, Esq.

(57) ABSTRACT

Provided is a liquid crystal composition capable of forming a light absorption anisotropic film with excellent light resistance, a dichroic material, a light absorption anisotropic film, a laminate, and an image display device. The liquid crystal composition contains a liquid crystal compound and a dichroic material having a structure represented by Formula (1).

(1)

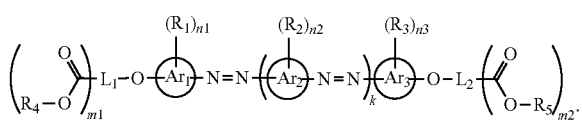

20 Claims, 1 Drawing Sheet

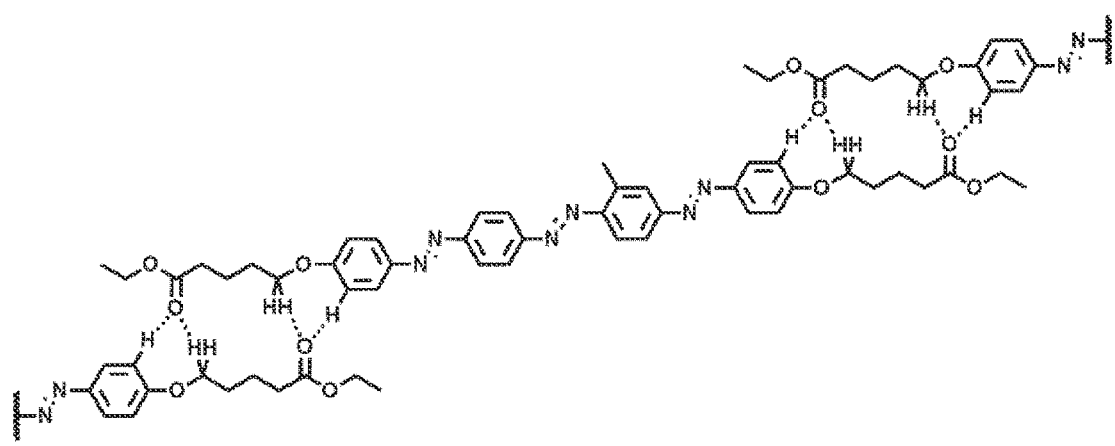

LIQUID CRYSTAL COMPOSITION, DICHROIC MATERIAL, LIGHT ABSORPTION ANISOTROPIC FILM, LAMINATE, AND IMAGE DISPLAY DEVICE

CROSS-REFERENCE TO RELATED APPLICATIONS

This application is a Continuation of PCT International Application No. PCT/JP2020/031232 filed on Aug. 19, 2020, which was published under PCT Article 21(2) in Japanese, and which claims priority under 35 U.S.C. § 119(a) to Japanese Patent Application No. 2019-162243 filed on Sep. 5, 2019. The above applications are hereby expressly incorporated by reference, in their entirety, into the present application.

BACKGROUND OF THE INVENTION

1. Field of the Invention

The present invention relates to a liquid crystal composition, a dichroic material, a light absorption anisotropic films, a laminate, and an image display device.

2. Description of the Related Art

In the related art, in a case where an attenuation function, a polarization function, a scattering function, a light-shielding function of irradiation light including laser light or natural light is required, a device that is operated according to principles different for each function is used. Therefore, products corresponding to the above-described functions are also produced by production processes different for each function.

For example, a linear polarizer or a circular polarizer is used in an image display device (for example, a liquid crystal display device) to control optical rotation or birefringence in display. Further, a circular polarizer is used in an organic light emitting diode (OLED) to prevent reflection of external light.

In the related art, iodine has been widely used as a dichroic material in these polarizers, but a polarizer that uses an organic dye in place of iodine as a dichroic material has also been examined.

For example, JP2019-120949A and JP2019-91088A disclose that a liquid crystal composition containing a dichroic material and a liquid crystal compound is used to form a light absorption anisotropic film.

SUMMARY OF THE INVENTION

In recent years, a light absorption anisotropic film formed of a liquid crystal composition containing a dichroic material has been required to further improve the performance, and one of such performances is light resistance.

As a result of evaluation on the light absorption anisotropic film formed of a liquid crystal composition containing a dichroic material described in the examples of JP2019-120949A and JP2019-91088A, the present inventors found that there is room for improvement in light resistance.

Therefore, an object of the present invention is to provide a liquid crystal composition capable of forming a light absorption anisotropic film with excellent light resistance, a dichroic material, a light absorption anisotropic film, a laminate, and an image display device.

As a result of intensive research conducted by the present inventors in order to achieve the above-described object, it was found that a light absorption anisotropic film with excellent light resistance can be formed by using a liquid crystal composition containing a dichroic material having a structure represented by Formula (1) shown below, thereby completing the present invention.

That is, the present inventors found that the above-described problems can be solved by employing the following configurations.

[1] A liquid crystal composition comprising: a liquid crystal compound; and a dichroic material having a structure represented by Formula (1).

In Formula (1), $Ar_1$ represents a (n1+2)-valent aromatic hydrocarbon group or heterocyclic group, $Ar_2$ represents a (n2+2)-valent aromatic hydrocarbon group or heterocyclic group, and $Ar_3$ represents a (n3+2)-valent aromatic hydrocarbon group or heterocyclic group.

In Formula (1), $R_1$, $R_2$, and $R_3$ each independently represent a monovalent substituent. A plurality of $R_1$'s may be the same as or different from each other in a case of "n1≥2", a plurality of $R_2$'s may be the same as or different from each other in a case of "n2≥2", and a plurality of $R_3$'s may be the same as or different from each other in a case of "n3≥2".

In Formula (1), k represents 1 or 2. In a case of "k=2", a plurality of $Ar_2$'s may be the same as or different from each other and a plurality of $R_2$'s may be the same as or different from each other.

In Formula (1), n1, n2, and n3 each independently represent an integer of 0 to 4. Here, an expression of "n1+n2+n3≥0" is satisfied in a case of "k=1", and an expression of "n1+n2+n3≥1" is satisfied in a case of "k=2".

In Formula (1), m1 and m2 each independently represent 0 or 1. However, m1+m2 is 1 or 2.

In Formula (1), $R_4$ represents an aliphatic hydrocarbon group, an aromatic hydrocarbon group, or a heterocyclic group in a case of "m1=1", and $R_5$ represents an aliphatic hydrocarbon group, an aromatic hydrocarbon group, or a heterocyclic group in a case of "m2=1".

In Formula (1), $L_1$ represents a monovalent substituent in a case of "m1=0", $L_1$ represents a divalent linking group in a case of "m1=1", $L_2$ represents a monovalent substituent in a case of "m2=0", and $L_2$ represents a divalent linking group in a case of "m2=1".

[2] The liquid crystal composition according to [1], in which in Formula (1), k represents 2.

[3] The liquid crystal composition according to [1] or [2], in which in Formula (1), $L_1$ represents a linear or branched alkylene group having 2 to 6 carbon atoms in a case of "m1=1", and $L_2$ represents a linear or branched alkylene group having 2 to 6 carbon atoms in a case of "m2=1".

[4] The liquid crystal composition according to any one of [1] to [3], in which in Formula (1), $Ar_1$, $Ar_2$, and $Ar_3$ all represent a phenylene group.

[5] The liquid crystal composition according to any one of [1] to [4], in which in Formula (1), $R_4$ represents an alkyl group having 1 to 6 carbon atoms in a case of "m1=1", and $R_5$ represents an alkyl group having 1 to 6 carbon atoms in a case of "m2=1".

[6] The liquid crystal composition according to any one of [1] to [5], in which the liquid crystal compound is a polymer liquid crystal compound and has a crosslinkable group at a terminal.

[7] The liquid crystal composition according to any one of [1] to [6], further comprising: one or more kinds of dichroic materials other than the dichroic material having a structure represented by Formula (1).

[8] A dichroic material which has a structure represented by Formula (1).

In Formula (1), $Ar_1$ represents a (n1+2)-valent aromatic hydrocarbon group or heterocyclic group, $Ar_2$ represents a (n2+2)-valent aromatic hydrocarbon group or heterocyclic group, and $Ar_3$ represents a (n3+2)-valent aromatic hydrocarbon group or heterocyclic group.

In Formula (1), $R_1$, $R_2$, and $R_3$ each independently represent a monovalent substituent. A plurality of $R_1$'s may be the same as or different from each other in a case of "n1≥2", a plurality of $R_2$'s may be the same as or different from each other in a case of "n2≥2", and a plurality of $R_3$'s may be the same as or different from each other in a case of "n3≥2". In Formula (1), k represents 1 or 2. In a case of "k=2", a plurality of $Ar_2$'s may be the same as or different from each other and a plurality of $R_2$'s may be the same as or different from each other.

In Formula (1), n1, n2, and n3 each independently represent an integer of 0 to 4. Here, an expression of "n1+n2+n3≥0" is satisfied in a case of "k=1", and an expression of "n1+n2+n3≥1" is satisfied in a case of "k=2".

In Formula (1), m1 and m2 each independently represent 0 or 1. However, m1+m2 is 1 or 2.

In Formula (1), $R_4$ represents an aliphatic hydrocarbon group, an aromatic hydrocarbon group, or a heterocyclic group in a case of "m1=1", and $R_5$ represents an aliphatic hydrocarbon group, an aromatic hydrocarbon group, or a heterocyclic group in a case of "m2=1".

In Formula (1), $L_1$ represents a monovalent substituent in a case of "m1=0", $L_1$ represents a divalent linking group in a case of "m1=1", $L_2$ represents a monovalent substituent in a case of "m2=0", and $L_2$ represents a divalent linking group in a case of "m2=1".

[9] The dichroic material according to [8], in which in Formula (1), k represents 2.

[10] The dichroic material according to [8] or [9], in which in Formula (1), $L_1$ represents a linear or branched alkylene group having 2 to 6 carbon atoms in a case of "m1=1", and $L_2$ represents a linear or branched alkylene group having 2 to 6 carbon atoms in a case of "m2=1".

[11] The dichroic material according to any one of [8] to [10], in which in Formula (1), $Ar_1$, $Ar_2$, and $Ar_3$ all represent a phenylene group.

[12] The dichroic material according to any one of [8] to [11], in which in Formula (1), $R_4$ represents an alkyl group having 1 to 6 carbon atoms in a case of "m1=1", and $R_5$ represents an alkyl group having 1 to 6 carbon atoms in a case of "m2=1".

[13] A light absorption anisotropic film which is formed of the liquid crystal composition according to any one of [1] to [7].

[14] A laminate comprising: a base material; and the light absorption anisotropic film according to [13] formed on the base material.

[15] The laminate according to [14], further comprising: a λ/4 plate formed on the light absorption anisotropic film.

[16] The laminate according to [14] or [15], further comprising: a barrier layer formed on the light absorption anisotropic film.

[17] An image display device comprising: the light absorption anisotropic film according to [13] or the laminate according to any one of [14] to [16].

According to the present invention, it is possible to provide a liquid crystal composition capable of forming a light absorption anisotropic film with excellent light resistance, a dichroic material, a light absorption anisotropic film, a laminate, and an image display device.

BRIEF DESCRIPTION OF THE DRAWINGS

FIG. 1 is a conceptual view showing an aspect of a hydrogen bond in a dichroic material according to the embodiment of the present invention.

DESCRIPTION OF THE PREFERRED EMBODIMENTS

Hereinafter, the present invention will be described in detail.

The description of constituent elements described below may be made based on typical embodiments of the present invention, but the present invention is not limited to such embodiments.

In addition, in the present specification, a numerical range shown using "to" indicates a range including numerical values described before and after "to" as a lower limit and an upper limit.

In the present specification, (meth)acrylic acid is a generic term for both "acrylic acid" and "methacrylic acid", and (meth)acryloyl is a generic term for both "acryloyl" and "methacryloyl".

[Liquid Crystal Composition]

The liquid crystal composition according to the embodiment of the present invention is a liquid crystal composition containing a liquid crystal compound and a dichroic material having a structure represented by Formula (1) shown below. In the present specification, the dichroic material having a structure represented by Formula (1) shown below may be referred to as a "specific dichroic material".

According to the liquid crystal composition according to the embodiment of the present invention, a light absorption anisotropic film having excellent light resistance can be formed. The details of the reason for this are not clear, but it is assumed as follows.

It is considered that an azo-based dichroic material of the related art realizes a high degree of alignment by being compatible with a liquid crystal compound. In this case, the dichroic material is assumed to be dispersed in the liquid crystal compound in a monomer state.

On the contrary, it is considered that since the specific dichroic material is phase-separated from a liquid crystal compound because the specific dichroic material has a low compatibility with a liquid crystal compound.

Here, the terminal group having an ester bond in the specific dichroic material is formed such that the orientation of the ester bond bonded to an azo group side is reversed as compared with a terminal group having an ester bond in an azo-based dichroic material of the related art. Specifically, in the specific dichroic material having $R_4$—O—C(O)— or $R_5$—O—C(O)— as a terminal group, —C(O)— constituting the ester bond of the terminal group is positioned on the azo group side. Further, in a dichroic material H1 containing an acryloyloxy group ($CH_2$=CH—C(O)—O—) as the terminal group used in examples, —O— in the ester bond of the terminal group is positioned on the azo group side.

Accordingly, as a result of a single crystal X-ray structure analysis performed using a dichroic material D1 (corresponding to the specific dichroic material) used in the examples described below, the present inventors found that the dichroic material D1 forms two hydrogen bonds on side chains of the ester bonds in an alignment state in a single crystal (FIG. 1). It is considered that the specific dichroic material strongly associates with itself due to the contribution of the hydrogen bonds, and thus the compatibility with a liquid crystal compound is low. It is considered that a dichroic material of the related art is compatible with a liquid crystal compound because the dichroic material does not have such a hydrogen bond.

As described above, it is assumed that since the specific dichroic material forms an associate in a liquid crystal composition, a light absorption anisotropic film formed by using the associate is excellent in light resistance.

Hereinafter, the components contained in the liquid crystal composition according to the embodiment of the present invention and components that can be contained therein will be described.

[Specific Dichroic Material]

The dichroic material according to the embodiment of the present invention is a dichroic material (specific dichroic material) having a structure represented by Formula (1). The liquid crystal composition according to the embodiment of the present invention contains a specific dichroic material as described above.

respectively rephrased as a divalent aromatic hydrocarbon group or a divalent heterocyclic group substituted with n1 to n3 substituents ($R_1$ to $R_3$ described below).

The divalent aromatic hydrocarbon group represented by $Ar_1$ to $Ar_3$ may be monocyclic or may have a bicyclic or higher cyclic fused ring structure. From the viewpoint of further improving the light resistance of the light absorption anisotropic film, the number of rings of the divalent aromatic hydrocarbon group is preferably in a range of 1 to 4, more preferably 1 or 2, and still more preferably 1 (that is, a phenylene group).

Specific examples of the divalent aromatic hydrocarbon group include a phenylene group, an azulene-diyl group, a naphthylene group, a fluorene-diyl group, an anthracene-diyl group, and a tetracene-diyl group. From the viewpoints of further improving the light resistance of the light absorp-

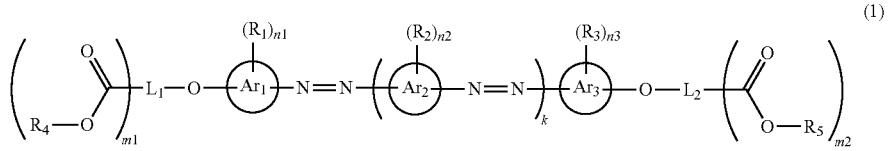

(1)

In Formula (1), $Ar_1$ represents a (n1+2)-valent aromatic hydrocarbon group or heterocyclic group, $Ar_2$ represents a (n2+2)-valent aromatic hydrocarbon group or heterocyclic group, and $Ar_3$ represents a (n3+2)-valent aromatic hydrocarbon group or heterocyclic group.

In Formula (1), $R_1$, $R_2$, and $R_3$ each independently represent a monovalent substituent. A plurality of $R_1$'s may be the same as or different from each other in a case of "n1≥2", a plurality of $R_2$'s may be the same as or different from each other in a case of "n2≥2", and a plurality of $R_3$'s may be the same as or different from each other in a case of "n3≥2".

In Formula (1), k represents 1 or 2. In a case of "k=2", a plurality of $Ar_2$'s may be the same as or different from each other and a plurality of $R_2$'s may be the same as or different from each other.

In Formula (1), n1, n2, and n3 each independently represent an integer of 0 to 4. Here, an expression of "n1+n2+n3≥0" is satisfied in a case of "k=1", and an expression of "n1+n2+n3≥1" is satisfied in a case of "k=2".

In Formula (1), m1 and m2 each independently represent 0 or 1. However, m1+m2 is 1 or 2.

In Formula (1), $R_4$ represents an aliphatic hydrocarbon group, an aromatic hydrocarbon group, or a heterocyclic group in a case of "m1=1", and $R_5$ represents an aliphatic hydrocarbon group, an aromatic hydrocarbon group, or a heterocyclic group in a case of "m2=1".

In Formula (1), $L_1$ represents a monovalent substituent in a case of "m1=0", and $L_1$ represents a divalent linking group in a case of "m1=1", $L_2$ represents a monovalent substituent in a case of "m2=0", and $L_2$ represents a divalent linking group in a case of "m2=1".

In Formula (1), $Ar_1$ represents an (n1+2)-valent (for example, trivalent in a case where n1 represents 1) aromatic hydrocarbon group or heterocyclic group, $Ar_2$ represents an (n2+2)-valent (for example, trivalent in a case where n2 represents 1) aromatic hydrocarbon group or heterocyclic group, and $Ar_3$ represents an (n3+2)-valent (for example, trivalent in a case where n3 represents 1) aromatic hydrocarbon group or heterocyclic group. Here, $Ar_1$ to $Ar_3$ can be tion anisotropic film, a phenylene group or a naphthylene group is preferable, and a phenylene group is more preferable.

The divalent heterocyclic group may be any of aromatic or non-aromatic, but a divalent aromatic heterocyclic group is preferable as the divalent heterocyclic group from the viewpoint of further improving the degree of alignment.

The divalent aromatic heterocyclic group may be monocyclic or may have a bicyclic or higher cyclic fused ring structure. The atoms other than carbon constituting the aromatic heterocyclic group include a nitrogen atom, a sulfur atom, and an oxygen atom. In a case where the aromatic heterocyclic group has a plurality of atoms constituting a ring other than carbon, these may be the same as or different from each other.

Specific examples of the aromatic heterocyclic group include a pyridylene group (pyridine-diyl group), thienylene (thiophene-diyl group), a quinolylene group (quinoline-diyl group), an isoquinolylene group (isoquinolin-diyl group), a thiazole-diyl group, a benzothiadiazole-diyl group, a phthalimide-diyl group, a thienothiazole-diyl group (in the present invention, referred to as a "thienothiazole group"), a thienothiophene-diyl group, and a thienooxazole-diyl group.

Among these, as the divalent aromatic heterocyclic group, a group having a monocycle or a bicyclic fused ring structure represented by the following structural formula can be preferably used. Further, in the following structural formulae below, "*" represents a bonding position with respect to an azo group or an oxygen atom in Formula (1).

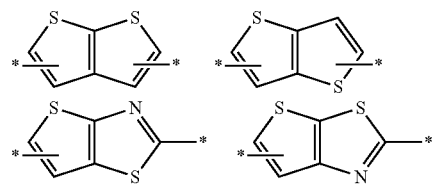

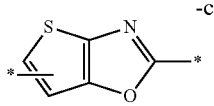

In Formula (1), from the viewpoint of further improving the light resistance of the light absorption anisotropic film, $Ar_1$ to $Ar_3$ all represent preferably a divalent aromatic hydrocarbon group and more preferably a phenylene group.

Here, in a case where $Ar_1$ represents a phenylene group, from the viewpoint of further improving the degree of alignment of the light absorption anisotropic film, the oxygen atom bonded to $Ar_1$ is positioned preferably at the meta position or para position with respect to the azo group bonded to $Ar_1$ and more preferably at the para position. From the same viewpoint as described above, in a case where $Ar_2$ represents a phenylene group, one azo group bonded to $Ar_2$ is positioned preferably at the meta position or para position with respect to the other azo group bonded to $Ar_2$ and more preferably at the para position. From the same viewpoint as described above, in a case where $Ar_3$ represents a phenylene group, the oxygen atom bonded to $Ar_3$ is positioned preferably at the meta position or para position with respect to the azo group bonded to $Ar_3$ and more preferably at the para position.

In Formula (1), $R_1$, $R_2$, and $R_3$ each independently represent a monovalent substituent. Examples of the monovalent substituent represented by $R_1$, $R_2$ and $R_3$ include a halogen atom, an alkyl group, an alkyloxy group, an alkylthio group, an oxycarbonyl group, a thioalkyl group, an acyloxy group, an acylamino group, an alkoxycarbonylamino group, a sulfonylamino group, a sulfamoyl group, a carbamoyl group, a sulfinyl group, and a ureido group. These substituents may be further substituted with these substituents.

Among these, from the viewpoint of further improving the light resistance of the specific dichroic material, as the monovalent substituent represented by $R_1$, $R_2$ and $R_3$, a fluorine atom, a chlorine atom, a methyl group, an ethyl group, a propyl group, a trifluoromethyl group, —O—$(C_2H_4O)$m-R', and —O—$(C_3H_6O)$m-R' are preferable, a fluorine atom, a chlorine atom, a methyl group, and an ethyl group are more preferable, and a chlorine atom, a methyl group, and an ethyl group are still more preferable. Here, R' represents a hydrogen atom, a methyl group, or an ethyl group, and in represents an integer of 0 to 6.

In Formula (1), k represents 1 or 2 and it is preferable that k represents 2 from the viewpoint that the light resistance is more excellent.

In Formula (1), n1, n2, and n3 each independently represent an integer of 0 to 4 and preferably an integer of 0 to 3.

Here, an expression of "n1+n2+n3≥0" is satisfied in a case where k represents 1. That is, in a case where Formula (1) has a bisazo structure, sufficient solubility in a solvent is obtained regardless of the presence or absence of the substituents ($R_1$ to $R_3$ in Formula (1)), but it is preferable that the structure has the substituents from the viewpoint of further improving the solubility in a solvent.

In a case where k represents 1, n1+n2+n3 is preferably in a range of 0 to 9, more preferably in a range of 1 to 9, and still more preferably in a range of 1 to 5.

Here, an expression of "n1+n2+n3≥1" is satisfied in a case where k represents 2. That is, in a case where Formula (1) has a trisazo structure, the structure has at least one substituent ($R_1$ to $R_3$ of Formula (1)).

In a case where k represents 2, n1+n2+n3 is preferably in a range of 1 to 9 and more preferably in a range of 1 to 5.

In Formula (1), m1 and m2 each independently represent 0 or 1. Here, m1+m2 is 1 or 2 and preferably 2 (that is, m1=m2=1) from the viewpoint of further improving the light resistance of the light absorption anisotropic film.

The aliphatic hydrocarbon group represented by $R_4$ and $R_5$ may be a saturated aliphatic hydrocarbon group or an unsaturated aliphatic hydrocarbon group, but is preferably a saturated aliphatic hydrocarbon group from the viewpoint of further improving the light resistance of the light absorption anisotropic film.

Examples of the saturated aliphatic hydrocarbon group represented by $R_4$ and $R_5$ include an alkyl group, which may have a linear, branched, or cyclic structure. Further, from the viewpoint of further improving the light resistance of the light absorption anisotropic film, the alkyl group is preferably linear or branched and more preferably linear.

From the viewpoint of further improving the light resistance of the light absorption anisotropic film, the number of carbon atoms of the saturated aliphatic hydrocarbon group (preferably an alkyl group) is preferably in a range of 1 to 20, more preferably in a range of 1 to 12, still more preferably in a range of 1 to 8, particularly preferably in a range of 1 to 6, and most preferably in a range of 1 to 3.

Specific examples of the saturated aliphatic hydrocarbon group include a methyl group, an ethyl group, an isopropyl group, a tert-butyl group, an n-octyl group, an n-decyl group, an n-hexadecyl group, a cyclopropyl group, a cyclopentyl group, and a cyclohexyl group.

Examples of the unsaturated aliphatic hydrocarbon group represented by $R_4$ and $R_5$ include an alkenyl group and an alkynyl group. Among these, an alkenyl group is preferable. The alkenyl group may have a linear branched, or cyclic structure, but is preferably linear. The alkynyl group may be linear or branched.

From the viewpoint of further improving the light resistance of the light absorption anisotropic film, the number of carbon atoms of the unsaturated aliphatic hydrocarbon group (preferably an alkenyl group or an alkynyl group) is preferably in a range of 2 to 20 carbon atoms, more preferably in a range of 2 to 12 carbon atoms, still more preferably in a range of 2 to 8 carbon atoms, particularly preferably in a range of 2 to 6 carbon atoms, and most preferably 2 or 3 carbon atoms.

Among the unsaturated aliphatic hydrocarbon groups, specific examples of the alkenyl group include a vinyl group, an aryl group, a 2-butenyl group, and a 3-pentenyl group, and specific examples of the alkynyl group include a propargyl group and a 3-pentynyl group.

Examples of the monovalent substituent represented by $L_1$, and $L_2$ include an alkyl group (preferably an alkyl group having 1 to 20 carbon atoms, more preferably an alkyl group having 1 to 12 carbon atoms, and particularly preferably an alkyl group having 1 to 8 carbon atoms, and examples thereof a methyl group, an ethyl group, an isopropyl group, a tert-butyl group, an n-octyl group, an n-decyl group, an n-hexadecyl group, a cyclopropyl group, a cyclopentyl group, and a cyclohexyl group), an alkenyl group (preferably an alkenyl group having 2 to 20 carbon atoms, more preferably an alkenyl group having 2 to 12 carbon atoms, and particularly preferably an alkenyl group having 2 to 8 carbon atoms, and examples thereof include a vinyl group, an allyl group, a 2-butenyl group, and a 3-pentenyl group), an alkynyl group (preferably an alkynyl group having 2 to 20 carbon atoms, more preferably an alkynyl group 2 to 12 carbon atoms, and particularly preferably an alkynyl group having 2 to 8 carbon atoms, and examples thereof include a propargyl group and a 3-pentynyl group), an aryl group (preferably an aryl group having 6 to 30 carbon atoms, more preferably an aryl group having 6 to 20 carbon atoms, and particularly preferably an aryl group having 6 to 12 carbon atoms, and examples thereof include a phenyl group, a 2,6-diethylphenyl group, a 3,5-ditrifluoromethylphenyl group, a naphthyl group, and a biphenyl group) a substituted or unsubstituted amino group (preferably an amino group having 0 to 20 carbon atoms, more preferably an amino group having 0 to 10 carbon atoms, and particularly preferably an amino group having 0 to 6 carbon atoms, and examples thereof include an unsubstituted amino group, a methylamino group, a dimethylamino group, a diethylamino group, and an anilino group), an alkoxy group (preferably an alkoxy group having 1 to 20 carbon atoms and more preferably an alkoxy group having 1 to 15 carbon atoms, and examples thereof include a methoxy group, an ethoxy group, and a butoxy group), an oxycarbonyl group (preferably an oxycarbonyl group having 2 to 20 carbon atoms, more preferably an oxycarbonyl group having 2 to 15 carbon atoms, and particularly preferably an oxycarbonyl group having 2 to 10 carbon atoms, and examples thereof include a methoxycarbonyl group, an ethoxycarbonyl group, and a phenoxycarbonyl group), an acyloxy group (preferably an acyloxy group having 2 to 20 carbon atoms, more preferably an acyloxy group having 2 to 10 carbon atoms, and particularly preferably an acyloxy group having 2 to 6 carbon atoms, and examples thereof include an acetoxy group and a benzoyloxy group), an acylamino group (preferably an acylamino group having 2 to 20 carbon atoms, more preferably an acylamino group having 2 to 10 carbon atoms, and particularly preferably an acylamino group having 2 to 6 carbon atoms, and examples thereof include an acetylamino group and a benzoylamino group), an alkoxycarbonylamino group (preferably an alkoxycarbonylamino group having 2 to 20 carbon atoms, more preferably an alkoxycarbonylamino group having 2 to 10 carbon atoms, and particularly preferably an alkoxycarbonylamino group having 2 to 6 carbon atoms, and examples thereof include a methoxycarbonylamino group), an aryloxycarbonylamino group (preferably an aryloxycarbonylamino group having 7 to 20 carbon atoms, more preferably an aryloxycarbonylamino group having 7 to 16 carbon atoms, and particularly preferably an aryloxycarbonylamino group having 7 to 12 carbon atoms, and examples thereof include a phenyloxycarbonylamino group), a sulfonylamino group (preferably a sulfonylamino group having 1 to 20 carbon atoms, more preferably a sulfonylamino group having 1 to 10 carbon atoms, and particularly preferably a sulfonylamino group having 1 to 6 carbon atoms, and examples thereof include a methanesulfonylamino group and a benzenesulfonylamino group), a sulfamoyl group (preferably a sulfamoyl group having 0 to 20 carbon atoms, more preferably a sulfamoyl group having 0 to 10 carbon atoms, and particularly preferably a sulfamoyl group having 0 to 6 carbon atoms, and examples thereof include an unsubstituted sulfamoyl group, a methylsulfamoyl group, a dimethylsulfamoyl group, and a phenylsulfamoyl group), a carbamoyl group (preferably a carbamoyl group having 1 to 20 carbon atoms, more preferably a carbamoyl group having 1 to 10 carbon atoms, and particularly preferably a carbamoyl group having 1 to 6 carbon atoms, and examples thereof include an unsubstituted carbamoyl group, a methylcarbamoyl group, a diethylcarbamoyl group, and a phenylcarbamoyl group), an alkylthio group (preferably an alkylthio group having 1 to 20 carbon atoms, more preferably an alkylthio group having 1 to 10 carbon atoms, and particularly preferably an alkylthio group having 1 to 6 carbon atoms, and examples thereof include a methylthio group and an ethylthio group), an arylthio group (preferably an arylthio group having 6 to 20 carbon atoms, more preferably an arylthio group having 6 to 16 carbon atoms, and particularly preferably an arylthio group having 6 to 12 carbon atoms, and examples thereof include a phenylthio group), a sulfonyl group (preferably a sulfonyl group having 1 to 20 carbon atoms, more preferably a sulfonyl group having 1 to 10 carbon atoms, and particularly preferably a sulfonyl group having 1 to 6 carbon atoms, and examples thereof include a mesyl group and a tosyl group), a sulfinyl group (preferably a sulfinyl group having 1 to 20 carbon atoms, more preferably a sulfinyl group having 1 to 10 carbon atoms, and particularly preferably a sulfinyl group having 1 to 6 carbon atoms, and examples thereof include a methanesulfinyl group and a benzenesulfinyl group), a ureido group (preferably a ureido group having 1 to 20 carbon atoms, more preferably a ureido group having 1 to 10 carbon atoms, and particularly preferably a ureido group having 1 to 6 carbon atoms, and examples thereof include an unsubstituted ureido group, a methylureido group, and a phenylureido group), a phosphoric acid amide group (preferably a phosphoric acid amide group having 1 to 20 carbon atoms, more preferably a phosphoric acid amide group having 1 to 10 carbon atoms, and particularly preferably a phosphoric acid amide group having 1 to 6 carbon atoms, and examples thereof include a diethylphosphoric acid amide group and a phenylphosphoric acid amide group), a heterocyclic group (preferably a heterocyclic group having 1 to 30 carbon atoms and more preferably a heterocyclic group having 1 to 12 carbon atoms, and examples thereof include a heterocyclic group having a heteroatom such as a nitrogen atom, an oxygen atom, or a sulfur atom, and examples of the heterocyclic group having a heteroatom include an imidazolyl group, a pyridyl group, a quinolyl group, a furyl group, a piperidyl group, a morpholino group, a benzoxazolyl group, a benzimidazolyl group, and a benzothiazolyl group), a silyl group (preferably a silyl group having 3 to 40 carbon atoms, more preferably a silyl group having 3 to 30 carbon atoms, and particularly preferably a silyl group having 3 to 24 carbon atoms, and examples thereof include a trimethylsilyl group and a triphenylsilyl group), a halogen atom (such as a fluorine atom, a chlorine atom, a bromine atom, and an iodine atom), a hydroxy group, a mercapto group, a cyano group, a nitro group, a hydroxamic acid group, a sulfino group, a hydrazino group, an imino group, and an azo group.

These substituents may be further substituted with these substituents. Further, in a case where two or more substituents are present, these may be the same as or different from each other. Further, these may be bonded to each other to form a ring where possible.

As the group in which the above-described substituent is further substituted with the above-described substituent, an $R_B$—$(O$—$R_A)_{na}$— group which is a group in which an alkoxy group is substituted with an alkyl group is exemplified. Here, in the formula, $R_A$ represents an alkylene group having 1 to 5 carbon atoms, $R_B$ represents an alkyl group having 1 to 5 carbon atoms, and na represents an integer of 1 to 10 (preferably an integer of 1 to 5 and more preferably an integer of 1 to 3).

Among these, as the monovalent substituent represented by $L_1$ and $L_2$, an alkyl group, an alkenyl group, and a group in which these groups are further substituted with these groups (for example, the $R_B$—$(OR_A)_{na}$— group described above) is preferable, and an alkyl group is more preferable.

Here, in a case where $L_1$ represents a monovalent substituent, $L_1$ does not include a group represented by $R_4$—O—C(O)— ($R_4$ has the same definition as described above). Similarly, in a case where $L_2$ represents a monovalent substituent, $L_2$ does not include a group represented by $R_5$—O—C(O)— ($R_5$ has the same definition as described above).

Examples of the divalent linking group represented by $L_1$ and $L_2$ include —O—, —S—, —C(O)—, —C(O)O—, —O—C(O)—O—, —C(O)—$NR_N$—, —O—C(O)—$NR_N$—, —$NR_N$—C(O)—$NR_N$—, —S(O)$_2$—, —S(O)—, an alkylene group, an alkenylene group, and a group obtained by combining two or more of these groups. $R_N$ represents a hydrogen atom or an alkyl group. In a case where a plurality of $R_N$'s are present, the plurality of $R_N$'S may be the same as or different from each other.

In the specific examples of the above-described divalent linking group, the bonding order is not particularly limited. For example, in a case where $L_1$ represents a group represented by —C(O)—$NR_N$—, the bonding site on the left side may be bonded to the $Ar_1$ side of Formula (1), or the bonding site on the right site may be bonded to the $Ar_1$ side of Formula (1).

The alkylene group may have any of a linear, branched, or cyclic structure, but from the viewpoint of further improving the light resistance of the light absorption anisotropic film, the alkylene group is preferably linear or branched and more preferably linear.

From the viewpoint of further improving the light resistance of the light absorption anisotropic film, the number of carbon atoms of the alkylene group is preferably in a range of 2 to 12, more preferably in a range of 2 to 8, particularly preferably in a range of 2 to 6, and most preferably in a range of 3 to 5.

The alkenylene group may have any of a linear, branched, or cyclic structure, but from the viewpoint of further improving the light resistance of the light absorption anisotropic film, the alkenylene group is preferably linear or branched and more preferably linear.

From the viewpoint of further improving the light resistance of the light absorption anisotropic film, the number of carbon atoms of the alkenylene group is preferably in a range of 2 to 12, more preferably in a range of 2 to 5, particularly preferably in a range of 2 to 6, and most preferably in a range of 3 to 5.

Among these, from the viewpoint of further improving the light resistance of the light absorption anisotropic film, as the divalent linking group represented by $L_1$ and $L_2$, an alkylene group or a group formed by combining an alkylene group with one or more groups selected from the group consisting of —O—, —C(O)O—, and —O—C(O)—O— is preferable, and an alkylene group is more preferable.

From the viewpoint of further improving the light resistance of the light absorption anisotropic film, it is preferable that the specific dichroic material is a dichroic material having a structure represented by Formula (1-1).

(1-1)

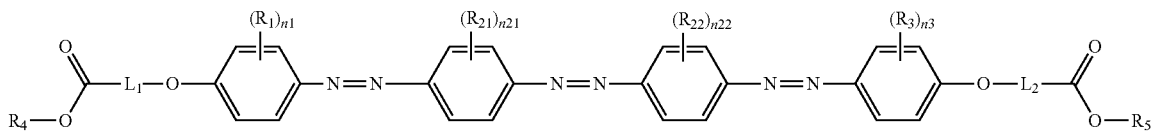

In Formula (1-1), $R_1$, $R_3$, $R_4$, $R_5$, n1, n3, $L_1$, and $L_2$ each have the same definition as that for $R_1$, $R_3$, $R_4$, $R_5$, n1, n3, $L_1$, and $L_2$ of Formula (1).

In Formula (1-1), $R_{21}$ and $R_{22}$ each have the same definition as that for $R_2$ in Formula (1).

In Formula (1-1), n21 and n22 each have the same definition as that for n2 in Formula (1).

An expression of "n1+n2+n22+n3≥1" is satisfied, and "n1+n21+n22+n3" is preferably in a range of 1 to 9 and more preferably in a range of 1 to 5.

Specific examples of the specific dichroic material will be described below, but the present invention is not limited thereto.

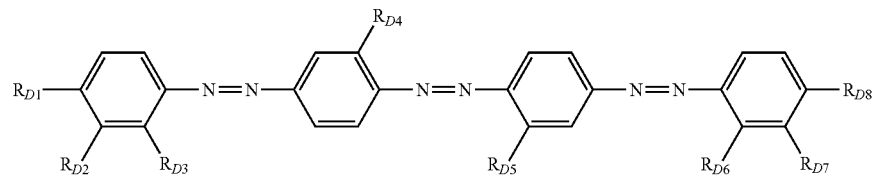

| No | $R_{D1}$ | $R_{D2}$ | $R_{D3}$ | $R_{D4}$ | $R_{D5}$ | $R_{D6}$ | $R_{D7}$ | $R_{D8}$ |
|---|---|---|---|---|---|---|---|---|
| D1 | $OC_4H_8C(O)OCH_2CH_3$ | H | H | H | $CH_3$ | H | H | $OC_4H_8C(O)OCH_2CH_3$ |
| D2 | $OC_4H_8C(O)OCH_3$ | H | H | H | $CH_3$ | H | H | $OC_4H_8C(O)OCH_3$ |
| D3 | $OC_4H_8C(O)OCH_2CH_3$ | H | H | H | $CH_3$ | H | H | $OC_{11}H_{23}$ |
| D4 | $OC_4H_8C(O)OCH_2CH_3$ | H | H | H | $CH_3$ | H | H | $OC_5H_{11}$ |
| D5 | $OC_4H_8C(O)OCH_2CH_3$ | H | H | H | $CH_3$ | H | H | $OCH_2CH_3$ |
| D6 | $OC_4H_8C(O)OCH_2CH_3$ | H | H | H | $CH_3$ | H | Cl | $OC_4H_8C(O)OCH_2CH_3$ |

-continued

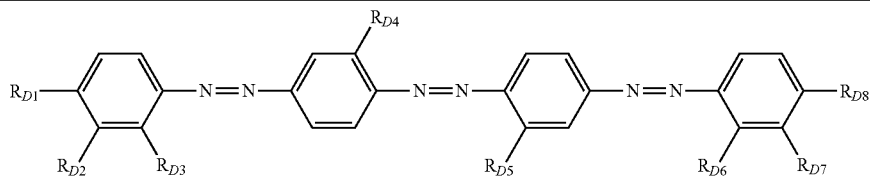

| No | $R_{D1}$ | $R_{D2}$ | $R_{D3}$ | $R_{D4}$ | $R_{D5}$ | $R_{D6}$ | $R_{D7}$ | $R_{D8}$ |
|---|---|---|---|---|---|---|---|---|
| D7 | $OC_3H_6C(O)OCH_2CH_3$ | H | H | H | $CH_3$ | H | H | $OC_3H_6C(O)OCH_2CH_3$ |
| D8 | $OC_3H_6C(O)OCH_2CH_3$ | H | H | Cl | H | Cl | H | $OC_3H_6C(O)OCH_2CH_3$ |
| D9 | $OC_9H_{18}C(O)OCH_2CH_3$ | H | H | H | $CH_3$ | H | H | $OC_9H_{18}C(O)OCH_2CH_3$ |
| D10 | $OC_4H_8C(O)OCH_2CH=CH_2$ | H | H | H | $CH_3$ | H | H | $OC_4H_8C(O)OCH_2CH=CH_2$ |
| D11 | $OC_4H_8C(O)OCH_2CH_3$ | H | H | H | Cl | H | H | $OC_4H_8C(O)OCH_2CH_3$ |
| D12 | $OC_6H_4C(O)OCH_2CH_3$ | H | H | H | $CH_3$ | H | H | $OC_6H_4C(O)OCH_2CH_3$ |

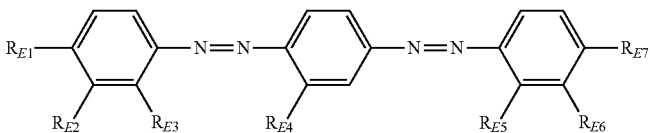

| No | $R_{E1}$ | $R_{E2}$ | $R_{E3}$ | $R_{E4}$ | $R_{E5}$ | $R_{E6}$ | $R_{E7}$ |
|---|---|---|---|---|---|---|---|
| E1 | $OC_4H_8C(O)OCH_2CH_3$ | H | H | H | H | H | $OC_4H_8C(O)OCH_2CH_3$ |
| E2 | $OC_4H_8C(O)OCH_3$ | H | H | H | H | H | $OC_4H_8C(O)OCH_3$ |
| E3 | $OC_4H_8C(O)OCH_2CH_3$ | Cl | H | H | H | Cl | $OC_4H_8C(O)OCH_2CH_3$ |
| E4 | $OC_4H_8C(O)OCH_2CH_3$ | H | H | H | H | Cl | $OC_5H_{11}$ |
| E5 | $OC_4H_8C(O)OCH_2CH_3$ | H | H | $CH_3$ | H | H | $OCH_2CH_3$ |
| E6 | $OC_3H_6C(O)OCH_2CH_3$ | H | H | H | H | H | $OC_3H_6C(O)OCH_2CH_3$ |
| E7 | $OC_9H_{18}C(O)OCH_2CH_3$ | H | H | H | H | H | $OC_9H_{18}C(O)OCH_2CH_3$ |
| E8 | $OC_4H_8C(O)OCH_2CH=CH_2$ | H | H | H | H | H | $OC_4H_8C(O)OCH_2CH=CH_2$ |

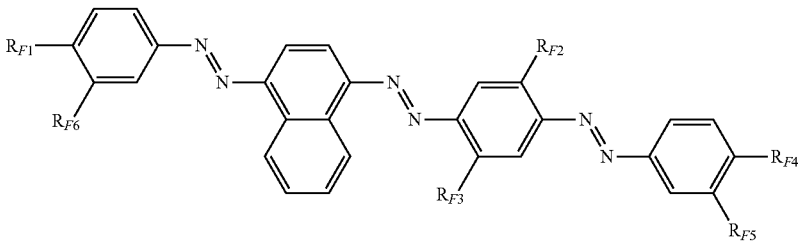

| No | $R_{F1}$ | $R_{F2}$ | $R_{F3}$ | $R_{F4}$ | $R_{F5}$ | $R_{F6}$ |
|---|---|---|---|---|---|---|
| F1 | $OC_4H_8C(O)OCH_2CH_3$ | H | H | $OC_4H_8C(O)OCH_2CH_3$ | H | H |
| F2 | $OC_4H_8C(O)OCH_3$ | H | $CH_3$ | $OC_4H_8C(O)OCH_3$ | H | H |
| F3 | $OC_3H_6C(O)OCH_2CH_3$ | H | H | $OC_3H_6C(O)OCH_2CH_3$ | H | Cl |

The specific dichroic material may be used alone or in combination of two or more kinds thereof.

The content of the specific dichroic material is preferably in a range of 0.1% to 50% by mass, more preferably in a range of 0.5% to 40% by mass, and still more preferably in a range of 1% to 20% by mass with respect to the total solid content of the liquid crystal composition.

In the present invention, the dichroic material indicates a dye having different absorbances depending on the direction.

The specific dichroic material may or may not exhibit liquid crystallinity.

In a case where the specific dichroic material exhibits liquid crystallinity, the specific dichroic material may exhibit any of nematic or smectic liquid crystallinity. The temperature at which the liquid crystal phase is exhibited is preferably in a range of room temperature (approximately 20° C. to 28° C.) to 300° C. and from the viewpoints of handleability and manufacturing suitability, more preferably in a range of 50° C. to 200° C.

[Liquid Crystal Compound]

The liquid crystal composition according to the embodiment of the present invention contains a liquid crystal compound. In a case where the composition contains a liquicrystal compound, the dichroic materials can be aligned with a high degree of alignment while the precipitation of the dichroic materials is suppressed.

The liquid crystal compound is a liquid crystal compound that does not exhibit dichroism.

As such a liquid crystal compound, both a low-molecular-weight liquid crystal compound and a polymer liquid crystal compound can be used. Here, the "low-molecular-weight liquid crystal compound" indicates a liquid crystal compound having no repeating units in the chemical structure. Here, the "polymer liquid crystal compound" is a liquid crystal compound having a repeating unit in the chemical structure.

Examples of the low-molecular-weight liquid crystal compound include liquid crystal compounds described in JP2013-228706A.

Examples of the polymer liquid crystal compound include thermotropic liquid crystal polymers described in JP2011-237513A. Further, from the viewpoint that the hardness (particularly, the bending resistance) of the light absorption anisotropic film has excellent hardness, it is preferable that the polymer liquid crystal compound contains a crosslinkable group at the terminal. Examples of the crosslinkable group include the polymerizable groups described in paragraphs [0040] to [0050] of JP2010-244038A. Among these, from the viewpoint of improving the reactivity and the synthetic suitability, an acryloyl group, a methacryloyl group, an epoxy group, an oxetanyl group, and a styryl group are preferable, and an acryloyl group and a methacryloyl group are more preferable.

The content of the liquid crystal compound is preferably in a range of 25 to 2000 parts by mass, more preferably in a range of 33 to 1000 parts by mass, and still more preferably in a range of 50 to 500 parts by mass with respect to 100 parts by mass which is the content of the dichroic materials in the liquid crystal composition. In a case where the content of the liquid crystal compound is in the above-described range, the degree of alignment of the polarizer is further improved.

The liquid crystal composition may contain only one or two or more kinds of liquid crystal compounds. In a case where the liquid crystal composition contains two or more kinds of liquid crystal compounds, the content of the liquid crystal compounds indicates the total content of the liquid crystal compounds.

From the viewpoint that the effects of the present invention are more excellent, it is preferable that the liquid crystal compound is a polymer liquid crystal compound having a repeating unit represented by Formula (1L) (hereinafter, also referred to as a "repeating unit (1L)").

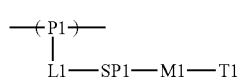

(1L)

In Formula (1L), P1 represents the main chain of the repeating unit, L1 represents a single bond or a divalent linking group, SP1 represents a spacer group, M1 represents a mesogen group, and T1 represents a terminal group.

Specific examples of the main chain of the repeating unit represented by P1 include groups represented by Formulae (P1-A) to (P1-D). Among these, from the viewpoints of diversity and handleability of a monomer serving as a raw material, a group represented by Formula (P1-A) is preferable.

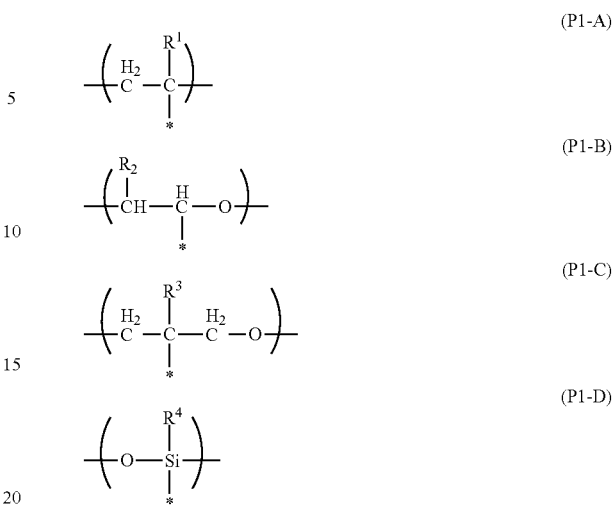

In Formulae (P1-A) to (P1-D), "*" represents a bonding position with respect to L1 in Formula (1L). In Formulae (P1-A) to (P1-D), $R^1$, $R^2$, $R^3$, and $R^4$ each independently represent a hydrogen atom, a halogen atom, an alkyl group having 1 to 10 carbon atoms, or an alkoxy group having 1 to 10 carbon atoms. The alkyl group may be a linear or branched alkyl group or an alkyl group having a cyclic structure (cycloalkyl group). Further, the number of carbon atoms of the alkyl group is preferably in a range of 1 to 5.

It is preferable that the group represented by Formula (P1-A) is a unit of a partial structure of poly(meth)acrylic acid ester obtained by polymerization of (meth)acrylic acid ester.

It is preferable that the group represented by Formula (P1-B) is an ethylene glycol unit formed by ring-opening polymerization of an epoxy group of a compound containing the epoxy group.

It is preferable that the group represented by Formula (P1-C) is a propylene glycol unit formed by ring-opening polymerization of an oxetane group of a compound containing the oxetane group.

It is preferable that the group represented by Formula (P1-D) is a siloxane unit of a polysiloxane obtained by polycondensation of a compound containing at least one of an alkoxysilyl group or a silanol group. Here, examples of the compound containing at least one of an alkoxysilyl group or a silanol group include a compound containing a group represented by Formula $SiR^4(OR_5)_2$—. In the formula, $R^4$ has the same definition as that for $R^4$ in Formula (P1-D), and a plurality of $R^5$'s each independently represent a hydrogen atom or an alkyl group having 1 to 10 carbon atoms.

L1 represents a single bond or a divalent linking group. Examples of the divalent linking group represented by L1 include —C(O)O—, —OC(O)—, —O—, —S—, —C(O)NR$^3$—, —NR$^3$C(O)—, —SO$_2$—, and —NR$^3$R$^4$—. In the formulae, $R^3$ and $R^4$ each independently represent a hydrogen atom or an alkyl group having 1 to 6 carbon atoms which may have a substituent W (described below).

In a case where P1 represents a group represented by Formula (P1-A), from the viewpoint that the effects of the present invention are more excellent, it is preferable that L1 represents a group represented by —C(O)O—.

In a case where P1 represents a group represented by any of Formulae (P1-B) to (P1-D), from the viewpoint that the effects of the present invention are more excellent, it is preferable that L1 represents a single bond.

From the viewpoints of easily exhibiting liquid crystallinity and the availability of raw materials, it is preferable that the spacer group represented by SP1 has at least one structure selected from the group consisting of an oxyethylene structure, an oxypropylene structure, a polysiloxane structure, and an alkylene fluoride structure.

Here, as the oxyethylene structure represented by SP1, a group represented by *—$(CH_2—CH_2O)_{n1}$—* is preferable. In the formula, n1 represents an integer of 1 to 20, and "*" represents a bonding position with respect to L1 or M1 in Formula (1L). From the viewpoint that the effects of the present invention are more excellent, n1 represents preferably an integer of 2 to 10, more preferably an integer of 2 to 4, and most preferably 3.

Further, from the viewpoint that the effects of the present invention are more excellent, a group represented by *—$(CH(CH_3)—CH_2O)_{n2}$—* is preferable as the oxypropylene structure represented by SP1. In the formula, n2 represents an integer of 1 to 3, and "*" represents a bonding position with respect to L1 or M1.

Further, from the viewpoint that the effects of the present invention are more excellent, a group represented by *—$(Si(CH_3)_2—O)_{n3}$—* is preferable as the polysiloxane structure represented by SP1. In the formula, n3 represents an integer of 6 to 10, and "*" represents a bonding position with respect to L1 or M1.

Further, from the viewpoint that the effects of the present invention are more excellent, a group represented by *—$(CF_2—CF_2)_{n4}$—* is preferable as the alkylene fluoride structure represented by SP1. In the formula, n4 represents an integer of 6 to 10, and represents a bonding position with respect to L1 or M1.

The mesogen group represented by M1 is a group showing a main skeleton of a liquid crystal molecule that contributes to liquid crystal formation. A liquid crystal molecule exhibits liquid crystallinity which is in an intermediate state (mesophase) between a crystal state and an isotropic liquid state. The mesogen group is not particularly limited and for example, particularly description on pages 7 to 16 of "FlussigeKristalle in Tabellen II" (VEB Deutsche Verlag fur Grundstoff Industrie, Leipzig, 1984) and particularly the description in Chapter 3 of "Liquid Crystal Handbook" (Maruzen, 2000) edited by Liquid Crystals Handbook Editing Committee can be referred to.

As the mesogen group, for example, a group having at least one cyclic structure selected from the group consisting of an aromatic hydrocarbon group, a heterocyclic group, and an alicyclic group is preferable.

From the viewpoint that the effects of the present invention are more excellent, the mesogen group contains preferably an aromatic hydrocarbon group, more preferably 2 to 4 aromatic hydrocarbon groups, and still more preferably 3 aromatic hydrocarbon groups.

From the viewpoints of exhibiting the liquid crystallinity, adjusting the liquid crystal phase transition temperature, and the availability of raw materials and synthetic suitability and from the viewpoint that the effects of the present invention are more excellent, as the mesogen group, a group represented by Formula (M1-A) or Formula (M1-B) is preferable, and a group represented by Formula (M1-B) is more preferable.

(M1-A)

(M1-B)

In Formula (M1-A), A1 represents a divalent group selected from the group consisting of an aromatic hydrocarbon group, a heterocyclic group, and an alicyclic group. These groups may be substituted with an alkyl group, a fluorinated alkyl group, an alkoxy group, or a substituent W.

It is preferable that the divalent group represented by A1 is a 4- to 6-membered ring. Further, the divalent group represented by A1 may be a monocycle or a fused ring.

Further, "*" represents a bonding position with respect to SP1 or T1.

Examples of the divalent aromatic hydrocarbon group represented by A1 include a phenylene group, a naphthylene group, a fluorene-diyl group, an anthracene-diyl group, and a tetracene-diyl group. From the viewpoints of design diversity of a mesogenic skeleton and the availability of raw materials, a phenylene group or a naphthylene group is preferable, and a phenylene group is more preferable.

The divalent heterocyclic group represented by A1 may be any of aromatic or non-aromatic, but a divalent aromatic heterocyclic group is preferable as the divalent heterocyclic group from the viewpoint of further improving the degree of alignment.

The atoms other than carbon constituting the divalent aromatic heterocyclic group include a nitrogen atom, a sulfur atom, and an oxygen atom. In a case where the aromatic heterocyclic group has a plurality of atoms constituting a ring other than carbon, these may be the same as or different from each other.

Specific examples of the divalent aromatic heterocyclic group include a pyridylene group (pyridine-diyl group), a pyridazine-diyl group, an imidazole-diyl group, a thienylene group (thiophene-diyl group), a quinolylene group (quinoline-diyl group), an isoquinolylene group (isoquinoline-diyl group), an oxazole-diyl group, a thiazole-diyl group, an oxadiazole-diyl group, a benzothiazole-diyl group, a benzothiadiazole-diyl group, a phthalimido-diyl group, a thienothiazole-diyl group, a thiazolothiazole-diyl group, a thienothiophene-diyl group, and a thienooxazole-diyl group.

Specific examples of the divalent alicyclic group represented by A1 include a cyclopentylene group and a cyclohexylene group.

In Formula (M1-A), a1 represents an integer of 1 to 10. In a case where a1 represents 2 or greater, a plurality of A1's may be the same as or different from each other.

In Formula (M1-B), A2 and A3 each independently represent a divalent group selected from the group consisting of an aromatic hydrocarbon group, a heterocyclic group, and an alicyclic group. Specific examples and preferred embodiments of A2 and A3 are the same as those for A1 in Formula (M1-A), and thus description thereof will not be repeated.

In Formula (M1-B), a2 represents an integer of 1 to 10. In a case where a2 represents 2 or greater, a plurality of A2's may be the same as or different from each other, a plurality of A3's may be the same as or different from each other, and a plurality of LA1's may be the same as or different from each other. From the viewpoint that the effects of the present invention are more excellent, a2 represents preferably an integer of 2 or greater and more preferably 2.

In Formula (M1-B), in a case where a2 represents 1, LA1 represents a divalent linking group. In a case where a2 represents 2 or greater, a plurality of LA1's each independently represent a single bond or a divalent linking group, and at least one of the plurality of LA1's is a divalent linking group. In a case where a2 represents 2, from the viewpoint that the effects of the present invention are more excellent, it is preferable that one of the two LA1's represents a divalent linking group and the other represents a single bond.

In Formula (M1-B), examples of the divalent linking group represented by LA1 include —O—, —(CH$_2$)$_g$—, —(CF$_2$)$_g$—, —Si(CH$_3$)$_2$—, —(Si(CH$_3$)$_2$O)$_g$—, (OSi(CH$_3$)$_2$)$_g$— (here, g represents an integer of 1 to 10), —N(Z)—, —C(Z)=C(Z')—, —C(Z)=N—, —N=C(Z)—, —C(Z)$_2$—C(Z')$_2$—, —C(O)—, —OC(O)—, —C(O)O—, —O—C(O)O—, —N(Z)C(O)—, —C(O)N(Z)—, —C(Z)=C(Z')—C(O)O—, —O—C(O)—C(Z)=C(Z')—, —C(Z)=N—, —N=C(Z)—, —C(Z)=C(Z')—C(O)N(Z")—, —N(Z")—C(O)—C(Z)=C(Z')—, —C(Z)=C(Z')—C(O)—S—, —S—C(O)—C(Z)=C(Z')—, —C(Z)=N—N=C(Z')— (here, Z, Z', and Z" each independently represent a hydrogen atom, an alkyl group having 1 to 4 carbon atoms, a cycloalkyl group, an aryl group, a cyano group, or a halogen atom), —C≡C—, —N=N—, —S—, —S(O)—, —S(O)(O)—, —(O)S(O)O—, —O(O)S(O)O—, —SC(O)—, and —C(O)S—. Among these, from the viewpoint that the effects of the present invention are more excellent, —C(O)O— is preferable. LA1 may represent a group obtained by combining two or more of these groups.

Specific examples of M1 include the following structures. In the following specific examples, "Ac" represents an acetyl group.

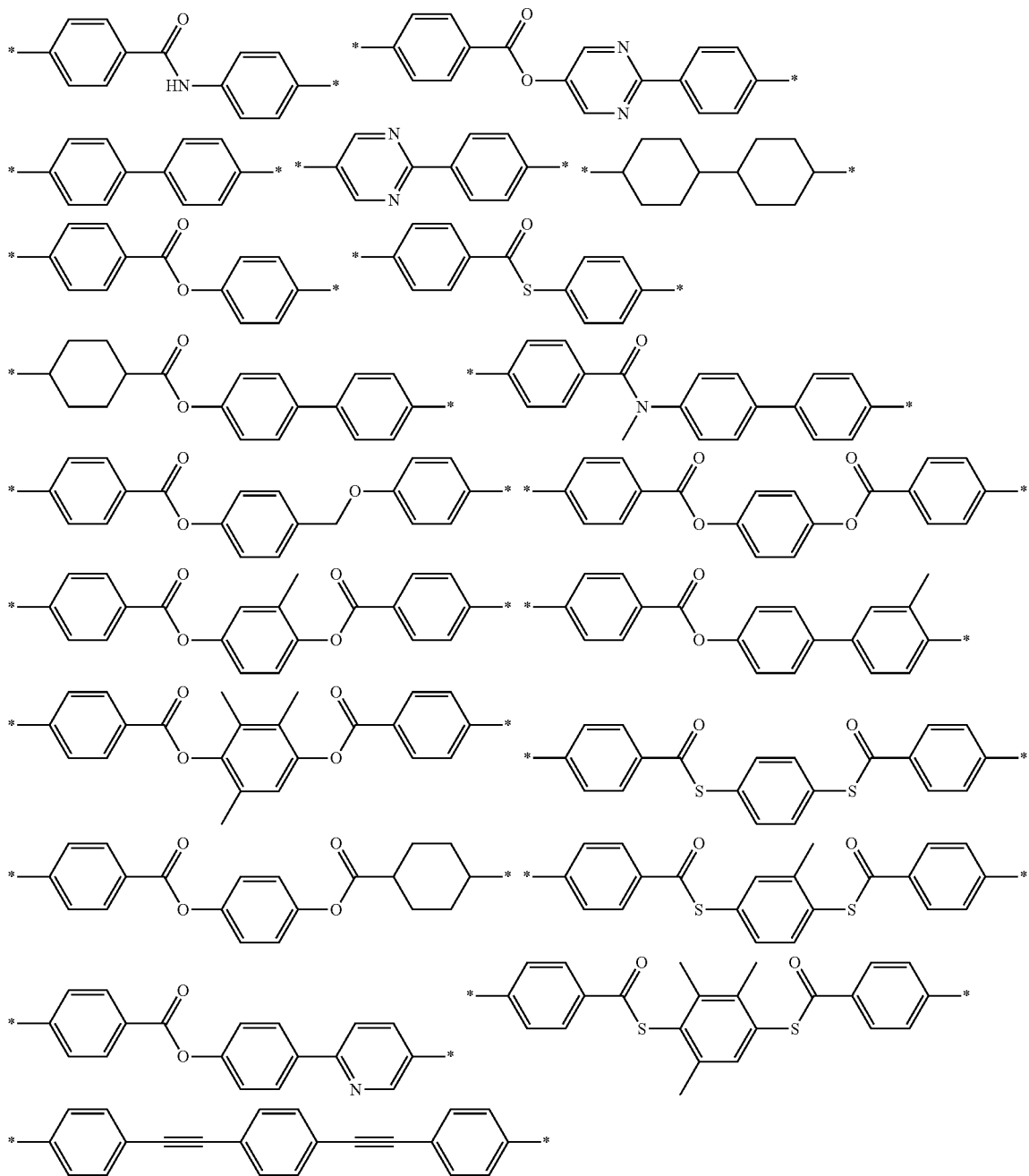

-continued
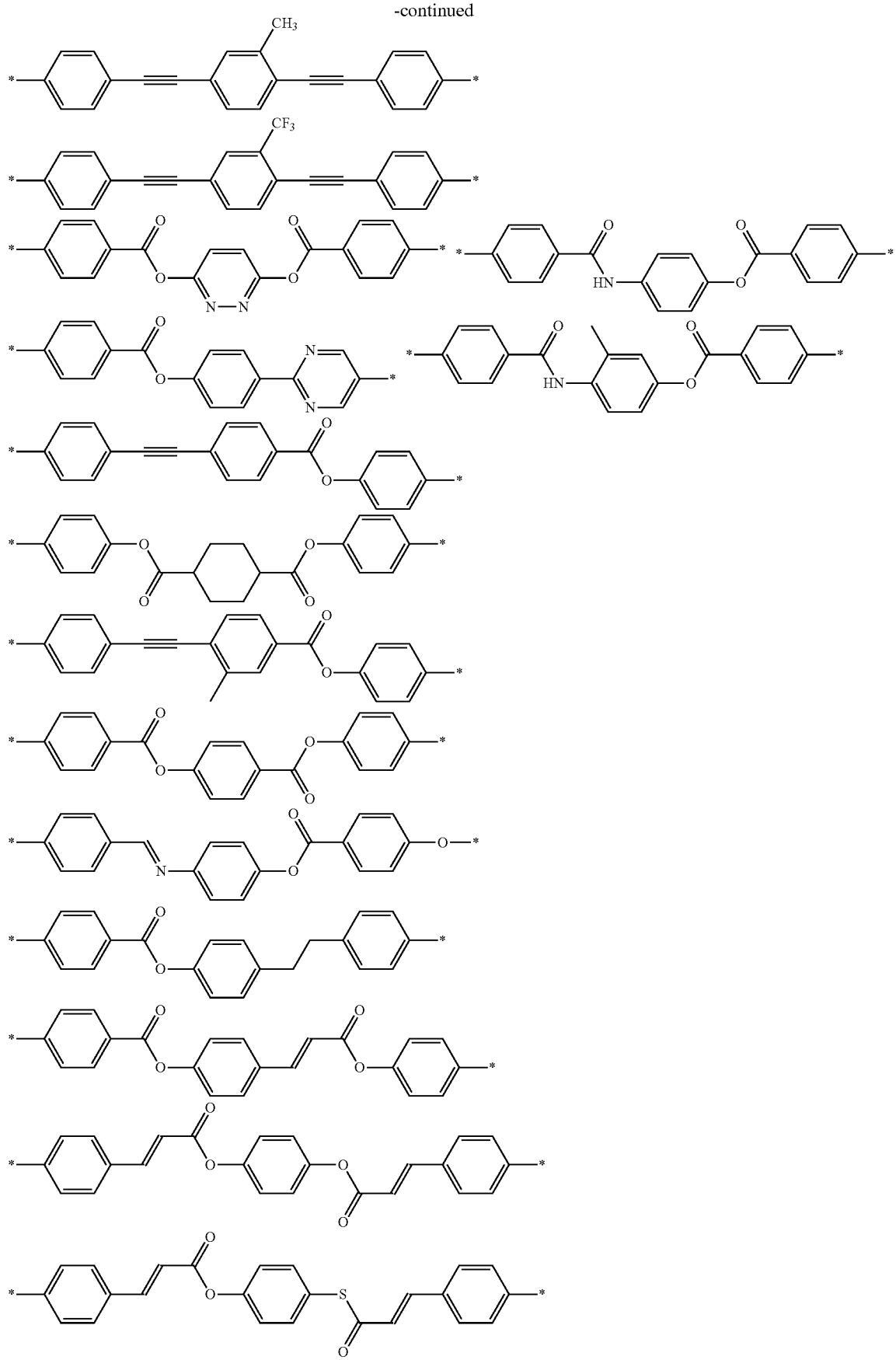

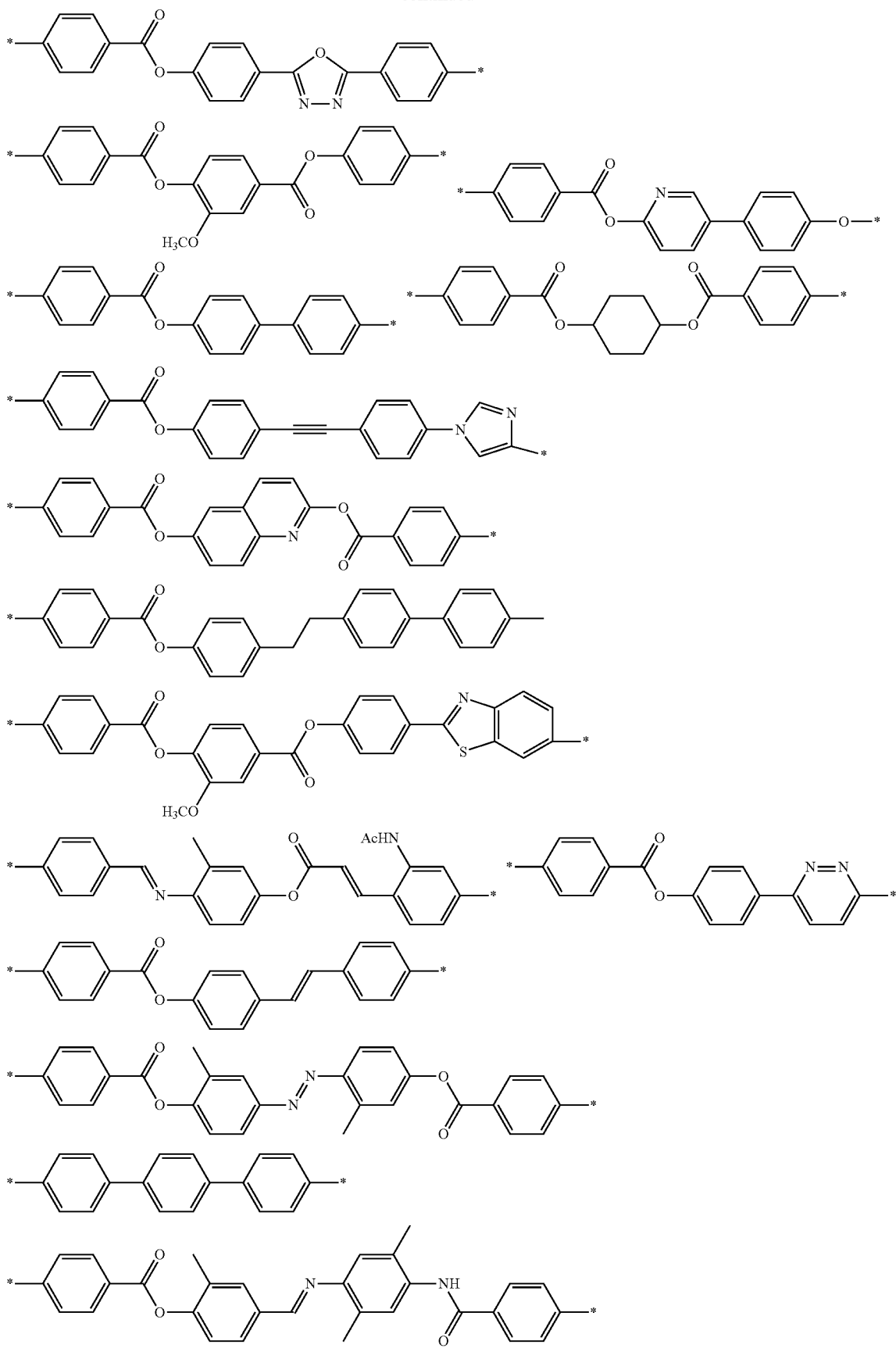

-continued
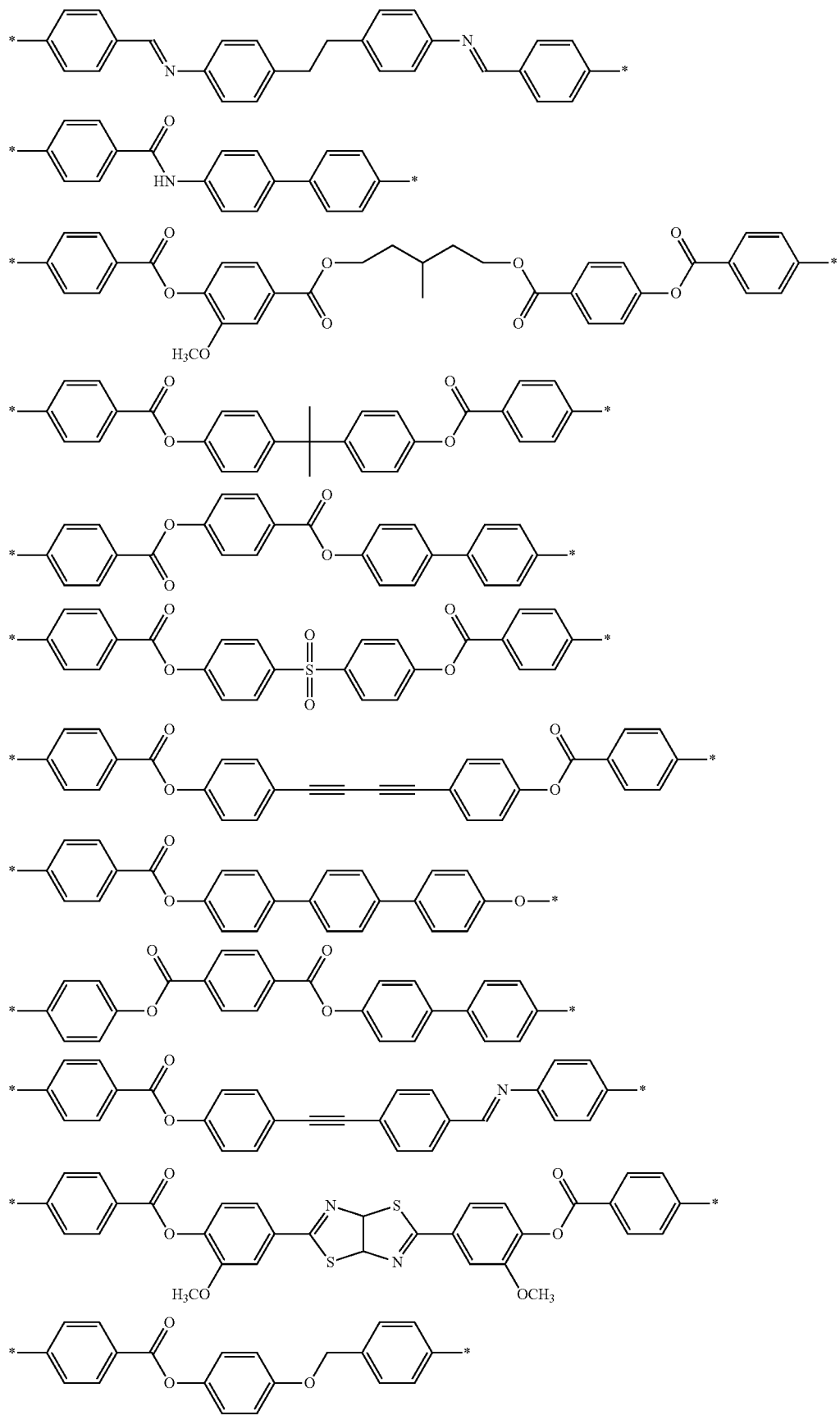

-continued

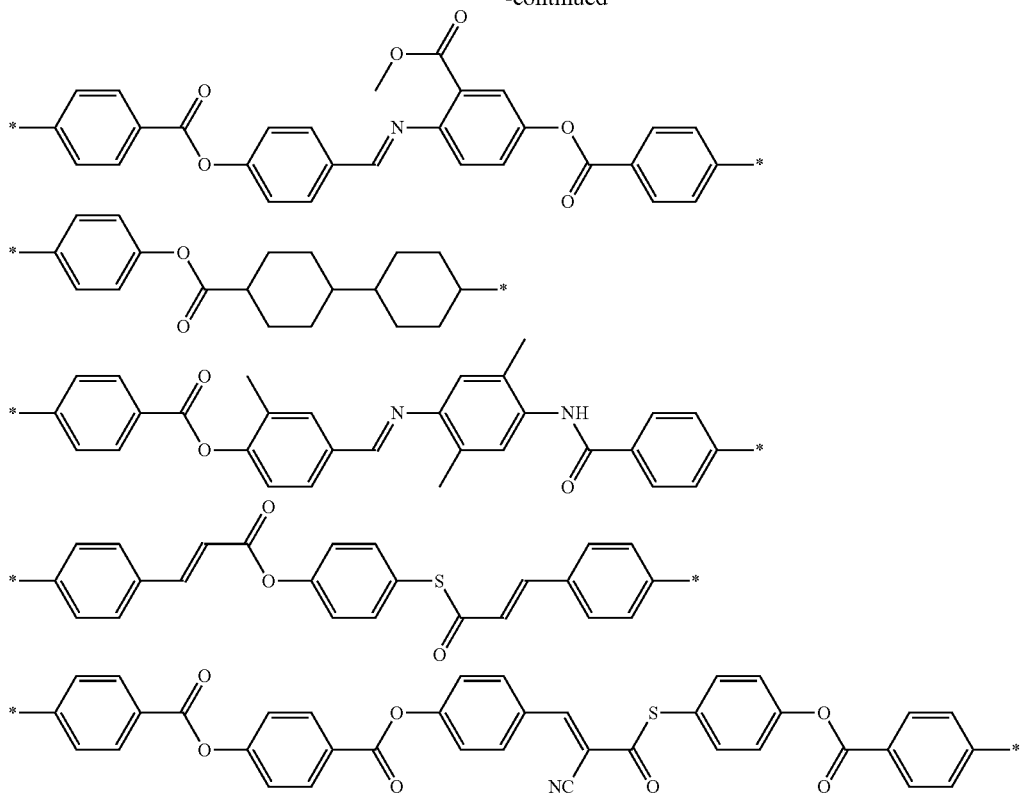

Examples of the terminal group represented by T1 include a hydrogen atom, a halogen atom, a cyano group, a nitro group, a hydroxy group, an alkyl group having 1 to 10 carbon atoms, an alkoxy group having 1 to 10 carbon atoms, an alkylthio group having 1 to 10 carbon atoms, an alkoxycarbonyloxy group having 1 to 10 carbon atoms, an alkoxycarbonyl group having 1 to 10 carbon atoms (ROC(O)—: R represents an alkyl group), an acyloxy group having 1 to 10 carbon atoms, an acylamino group having 1 to 10 carbon atoms, an alkoxycarbonylamino group having 1 to 10 carbon atoms, a sulfonylamino group having 1 to 10 carbon atoms, a sulfamoyl group having 1 to 10 carbon atoms, a carbamoyl group having 1 to 10 carbon atoms, a sulfinyl group having 1 to 10 carbon atoms, a ureido group having 1 to 10 carbon atoms, and a (meth)acryloyloxy group-containing group. Examples of the (meth)acryloyloxy group-containing group include a group represented by -L-A (L represents a single bond or a linking group, specific examples of the linking group are the same as those for L1 and SP1 described above, and A represents a (meth)acryloyloxy group).

From the viewpoint that the effects of the present invention are more excellent, T1 represents preferably an alkoxy group having 1 to 10 carbon atoms, more preferably an alkoxy group having 1 to 5 carbon atoms, and still more preferably a methoxy group. These terminal groups may be further substituted with these groups or the above-described crosslinkable groups.

From the viewpoint that the effects of the present invention are more excellent, the number of atoms in the main chain of T1 is preferably in a range of 1 to 20, more preferably in a range of 1 to 15, still more preferably in a range of 1 to 10, and particularly preferably in a range of 1 to 7. In a case where the number of atoms in the main chain of T1 is 20 or less, the degree of alignment of the polarizer is further improved. Here, the "main chain" in T1 indicates the longest molecular chain bonded to M1, and the number of hydrogen atoms is not included in the number of atoms in the main chain of T1. For example, the number of atoms in the main chain is 4 in a case where T1 represents an n-butyl group, the number of atoms in the main chain is 3 in a case where T1 represents a sec-butyl group.

From the viewpoint that the effects of the present invention are more excellent, the content of the repeating unit (1L) is preferably in a range of 20% to 100% by mass with respect to 100% by mass of all the repeating units of the polymer liquid crystal compound.

In the present invention, the content of each repeating unit contained in the polymer liquid crystal compound is calculated based on the charged amount (mass) of each monomer used for obtaining each repeating unit.

The polymer liquid crystal compound may have only one or two or more kinds of repeating units (1L). Among these, from the viewpoint that the effects of the present invention are more excellent, the polymer liquid crystal compound may have two kinds of the repeating units (1L).

In a case where the polymer liquid crystal compound has two kinds of the repeating units (1L), from the viewpoint that the effects of the present invention are more excellent, it is preferable that the terminal group represented by T1 in one (repeating unit A) is an alkoxy group and the terminal group represented by T1 in the other (repeating unit B) is a group other than the alkoxy group.

From the viewpoint that the effects of the present invention are more excellent, as the terminal group represented by T1 in the repeating unit B, an alkoxycarbonyl group, a cyano group, or a (meth)acryloyloxy group-containing group is preferable, and an alkoxycarbonyl group or a cyano group is more preferable.

From the viewpoint that the effects of the present invention are more excellent, the ratio (A/B) of the content of the repeating unit A in the polymer liquid crystal compound to the content of the repeating unit B in the polymer liquid crystal compound is preferably in a range of 50/50 to 95/5, more preferably in a range of 60/40 to 93/7, and still more preferably in a range of 70/30 to 90/10.

Further, the polymer liquid crystal compound may have the repeating unit (1L) and a repeating unit containing no mesogen group. Examples of the repeating unit containing no mesogen group include a repeating unit in which M1 in Formula (1L) represents a single bond.

In a case where the polymer liquid crystal compound has a repeating unit containing no mesogen group, the content of such a repeating unit is preferably greater than 0% by mass and 20% by mass or less with respect to 100% by mass of all the repeating units of the polymer liquid crystal compound.

(Weight-Average Molecular Weight)

From the viewpoint that the effects of the present invention are more excellent, the weight-average molecular weight (Mw) of the polymer liquid crystal compound is preferably in a range of 1000 to 500000 and more preferably in a range of 2000 to 300000. In a case where the Mw of the polymer liquid crystal compound is in the above-described range, the polymer liquid crystal compound is easily handled.

In particular, from the viewpoint of suppressing cracking during the coating, the weight-average molecular weight (Mw) of the polymer liquid crystal compound is preferably 10000 or greater and more preferably in a range of 10000 to 300000.

In addition, from the viewpoint of the temperature latitude of the degree of alignment, the weight-average molecular weight (Mw) of the polymer liquid crystal compound is preferably less than 10000 and preferably 2000 or greater and less than 10000.

Here, the weight-average molecular weight and the number average molecular weight in the present invention are values measured according to gel permeation chromatography (GPC).

Solvent (eluent): N-methylpyrrolidone
Equipment name: TOSOH HLC-8220GPC
Column: Connect and use three of TOSOH TSKgel Super AWM-H (6 m×15 cm)
Column temperature: 25° C.
Sample concentration: 0.1% by mass
Flow rate: 0.35 mL/min
Calibration curve: TSK standard polystyrene (manufactured by TOSOH Corporation), calibration curves of 7 samples with Mw of 2800000 to 1050 (Mw/Mn=1.03 to 1.06) are used.

The substituent W in the present specification will be described.

Examples of the substituent W include an alkyl group (preferably an alkyl group having 1 to 2.0 carbon atoms, more preferably an alkyl group having 1 to 12 carbon atoms, and particularly preferably an alkyl group having 1 to 8 carbon atoms, and examples thereof a methyl group, an ethyl group, an isopropyl group, a tert-butyl group, an n-octyl group, an n-decyl group, an n-hexadecyl group, a cyclopropyl group, a cyclopentyl group, and a cyclohexyl group), an alkenyl group (preferably an alkenyl group having 2 to 20 carbon atoms, more preferably an alkenyl group having 2 to 12 carbon atoms, and particularly preferably an alkenyl group having 2 to 8 carbon atoms, and examples thereof include a vinyl group, an aryl group, a 2-butenyl group, and a 3-pentenyl group), an alkynyl group (preferably an alkynyl group having 2 to 20 carbon atoms, more preferably an alkynyl group 2 to 12 carbon atoms, and particularly preferably an alkynyl group having 2 to 8 carbon atoms, and examples thereof include a propargyl group and a 3-pentynyl group), an aryl group (preferably an aryl group having 6 to 30 carbon atoms, more preferably an aryl group having 6 to 20 carbon atoms, and particularly preferably an aryl group having 6 to 12 carbon atoms, and examples thereof include a phenyl group, a 2,6-diethylphenyl group, a 3,5-ditrifluoromethylphenyl group, a styryl group, a naphthyl group, and a biphenyl group), a substituted or unsubstituted amino group (preferably an amino group having 0 to 20 carbon atoms, more preferably an amino group having 0 to 1.0 carbon atoms, and particularly preferably an amino group having 0 to 6 carbon atoms, and examples thereof include an unsubstituted amino group, a methylamino group, a dimethylamino group, a diethylamino group, and an anilino group), an alkoxy group (preferably an alkoxy group having 1 to 20 carbon atoms and more preferably an alkoxy group having 1 to 1.5 carbon atoms, and examples thereof include a methoxy group, an ethoxy group, and a butoxy group), an oxycarbonyl group (preferably an oxycarbonyl group having 2 to 20 carbon atoms, more preferably an oxycarbonyl group having 2 to 15 carbon atoms, and particularly preferably an oxycarbonyl group having 2 to 10 carbon atoms, and examples thereof include a methoxycarbonyl group, an ethoxycarbonyl group, and a phenoxycarbonyl group), an acyloxy group (preferably an acyloxy group having 2 to 20 carbon atoms, more preferably an acyloxy group having 2 to 10 carbon atoms, and particularly preferably an acyloxy group having 2 to 6 carbon atoms, and examples thereof include an acetoxy group, a benzoyloxy group, an acryloyl group, and a methacryloyl group), an acylamino group (preferably an acylamino group having 2 to 20 carbon atoms, more preferably an acylamino group having 2 to 10 carbon atoms, and particularly preferably an acylamino group having 2 to 6 carbon atoms, and examples thereof include an acetylamino group and a benzoylamino group), an alkoxycarbonylamino group (preferably an alkoxycarbonylamino group having 2 to 20 carbon atoms, more preferably an alkoxycarbonylamino group having 2 to 10 carbon atoms, and particularly preferably an alkoxycarbonylamino group having 2 to 6 carbon atoms, and examples thereof include a methoxycarbonylamino group), an aryloxycarbonylamino group (preferably an aryloxycarbonylamino group having 7 to 20 carbon atoms, more preferably an aryloxycarbonylamino group having 7 to 16 carbon atoms, and particularly preferably an aryloxycarbonylamino group having 7 to 12 carbon atoms, and examples thereof include a phenyloxycarbonylamino group), a sulfonylamino group (preferably a sulfonylamino group having 1 to 20 carbon atoms, more preferably a sulfonylamino group having 1 to 10 carbon atoms, and particularly preferably a sulfonylamino group having 1 to 6 carbon atoms, and examples thereof include a methanesulfonylamino group and a benzenesulfonylamino group), an unsubstituted sulfamoyl group (preferably a sulfamoyl group having 0 to 20 carbon atoms, more preferably a sulfamoyl group having 0 to 10 carbon atoms, and particularly preferably a sulfamoyl group having 0 to 6 carbon atoms, and examples thereof include a sulfamoyl group, a methylsulfamoyl group, a dimethylsulfamoyl group, and a phenylsulfamoyl group), a carbamoyl group (preferably a carbamoyl group having 1 to 20 carbon atoms, more preferably a carbamoyl group having 1 to 10 carbon atoms, and particularly preferably a carbamoyl group having 1 to 6 carbon atoms, and examples thereof include an unsubstituted carbamoyl group, a methylcarbamoyl group, a diethylcarbamoyl group, and a phenylcarbamoyl group), an alkylthio group (preferably an alkylthio group having 1 to 20 carbon atoms, more preferably an alkylthio group having 1 to 10 carbon atoms, and particularly preferably an alkylthio group having 1 to 6 carbon atoms, and examples thereof include a methylthio group and an ethylthio group), an arylthio group (preferably an arylthio group having 6 to 20 carbon atoms, more preferably an arylthio group having 6 to 16 carbon atoms, and particularly preferably an arylthio group having 6 to 12 carbon atoms, and examples thereof include a phenylthio group), a sulfonyl group (preferably a sulfonyl group having 1 to 20 carbon atoms, more preferably a sulfonyl group having 1 to 10 carbon atoms, and particularly preferably a sulfonyl group having 1 to 6 carbon atoms, and examples thereof include a mesyl group and a tosyl group), a sulfinyl group (preferably a sulfinyl group having 1 to 20 carbon atoms, more preferably a sulfinyl group having 1 to 10 carbon atoms, and particularly preferably a sulfinyl group having 1 to 6 carbon atoms, and examples thereof include a methanesulfinyl group and a benzenesulfinyl group), a ureido group (preferably a ureido group having 1 to 20 carbon atoms, more preferably a ureido group having 1 to 10 carbon atoms, and particularly preferably a ureido group having 1 to 6 carbon atoms, and examples thereof include an unsubstituted ureido group, a methylureido group, and a phenylureido group), a phosphoric acid amide group (preferably a phosphoric acid amide group having 1 to 20 carbon atoms, more preferably a phosphoric acid amide group having 1 to 10 carbon atoms, and particularly preferably a phosphoric acid amide group having 1 to 6 carbon atoms, and examples thereof include a diethylphosphoric acid amide group and a phenylphosphoric acid amide group), a hydroxy group, a mercapto group, a halogen atom (such as a fluorine atom, a chlorine atom, a bromine atom, and an iodine atom), a cyano group, a nitro group, a hydroxamic acid group, a sulfino group, a hydrazino group, an imino group, an azo group, a heterocyclic group (preferably a heterocyclic group having 1 to 30 carbon atoms and more preferably a heterocyclic group having 1 to 12 carbon atoms, and examples thereof include a heterocyclic group having a heteroatom such as a nitrogen atom, an oxygen atom, or a sulfur atom, and examples of the heterocyclic group having a heteroatom include an epoxy group, an oxetanyl group, an imidazolyl group, a pyridyl group, a quinolyl group, a furyl group, a piperidyl group, a morpholino group, a maleimide group, a benzoxazolyl group, a benzimidazolyl group, and a benzothiazolyl group), a silyl group (preferably a silyl group having 3 to 40 carbon atoms, more preferably a silyl group having 3 to 30 carbon atoms, and particularly preferably a silyl group having 3 to 24 carbon atoms, and examples thereof include a trimethylsilyl group and a triphenylsilyl group), a carboxy group, a sulfonic acid group, and a phosphoric acid group.

[Solvent]

From the viewpoint of workability and the like, it is preferable that the liquid crystal composition according to the embodiment of the present invention contains a solvent.

Examples of the solvent include organic solvents such as ketones (such as acetone, 2-butanone, methyl isobutyl ketone, cyclopentanone, and cyclohexanone), ethers (such as dioxane, tetrahydrofuran, 2-methyltetrahydrofuran, cyclopentyl methyl ether, tetrahydropyran, and dioxolanes), aliphatic hydrocarbons (such as hexane), alicyclic hydrocarbons (such as cyclohexane), aromatic hydrocarbons (such as benzene, toluene, xylene, and trimethylbenzene), halogenated carbons (such as dichloromethane, trichloromethane, dichloroethane, dichlorobenzene, and chlorotoluene), esters (such as methyl acetate, ethyl acetate, butyl acetate, and ethyl lactate), alcohols (such as ethanol, isopropanol, butanol, cyclohexanol, isopentyl alcohol, neopentyl alcohol, diacetone alcohol, and benzyl alcohol), cellosolves (such as methyl cellosolve, ethyl cellosolve, and 1,2-dimethoxyethane), cellosolve acetates, sulfoxides (such as dimethyl sulfoxide), amides (such as dimethylformamide, dimethylacetamide, N-methylpyrrolidone, and N-ethylpyrrolidone), and heterocyclic compounds (such as pyridine), and water. These solvents may be used alone or in combination of two or more kinds thereof.

Among these solvents, ketones (particularly cyclopentanone and cyclohexanone), ethers (particularly tetrahydrofuran, cyclopentyl methyl ether, tetrahydropyran, and dioxolan), and amides (particularly dimethylformamide, dimethylacetamide, and N-methylpyrrolidone, and N-ethylpyrrolidone) are preferred.

In a case where the liquid crystal composition according to the embodiment of the present invention contains a solvent, the content of the solvent is preferably in a range of 80% to 99% by mass, more preferably in a range of 83% to 98% by mass, and still more preferably in a range of 85% to 96% by mass with respect to the total mass of the liquid crystal composition.

In a case where the liquid crystal composition contains two or more kinds of solvents, the content of the solvent indicates the total content of the solvents.

[Interface Improver]

It is preferable that the liquid crystal composition according to the embodiment of the present invention contains an interface improver. In a case where the liquid crystal composition contains an interface improver, the smoothness of the coated surface is improved, the degree of alignment is improved, and cissing and unevenness are suppressed so that the in-plane uniformity is expected to be improved.

As the interface improver, interface improvers that allow liquid crystal compounds to be horizontally aligned on the coated surface side are preferable, and compounds (horizontal alignment agents) described in paragraphs [0253] to [0293] of JP2011-237513A can be used. Further, fluorine (meth)acrylate-based polymers described in paragraphs [0018] to [0043] of JP2007-272185A can also be used. Compounds other than the compounds described above may be used as the interface modifier.

In a case where the liquid crystal composition according to the embodiment of the present invention contains an interface improver, the content of the interface improver is preferably in a range of 0.001 to 5 parts by mass and more preferably in a range of 0.01 to 3 parts by mass with respect to 100 parts by mass which is the total amount of the dichroic material and the polymer liquid crystal compound in the liquid crystal composition.

The liquid crystal composition may contain only one or two or more kinds of interface improvers. In a case where the liquid crystal composition contains two or more kinds of interface improvers, the content of the interface improvers indicates the total content of the interface improvers.

[Polymerization Initiator]

It is preferable that the liquid crystal composition according to the embodiment of the present invention contains a polymerization initiator.

The polymerization initiator is not particularly limited, but a compound having photosensitivity, that is, a photopolymerization initiator is preferable.

As the photopolymerization initiator, various compounds can be used without any particular limitation. Examples of the photopolymerization initiator include α-carbonyl compounds (U.S. Pat. Nos. 2,367,661A and 2,367,670A), acyloin ether (U.S. Pat. No. 2,448,828A), α-hydrocarbon-substituted aromatic acyloin compounds (U.S. Pat. No. 2,722,512A), polynuclear quinone compounds (U.S. Pat. Nos. 3,046,127A and 2,951,758A), a combination of a triarylimidazole dimer and a p-aminophenyl ketone (U.S. Pat. No. 3,549,367A), acridine and phenazine compounds (JP1985-105667A (JP-S60-105667A) and U.S. Pat. No. 4,239,850A), oxadiazole compounds (U.S. Pat. No. 4,212,970A), and acylphosphine oxide compounds (JP1988-40799B (JP-S63-40799B), JP1993-29234B (JP-H05-29234B), JP1998-95788A (JP-H10-95788A), and JP1998-29997A (JP-H10-29997A)).

As such a photopolymerization initiator, commercially available products can also be used, and examples thereof include IRGACURE 184, 907, 369, 651, 819, OXE-01, and OXE-02 (manufactured by BASF SE).

In a case where the liquid crystal composition according to the embodiment of the present invention contains a polymerization initiator, the content of the polymerization initiator is preferably in a range of 0.01 to 30 parts by mass and more preferably in a range of 0.1 to 15 parts by mass with respect to 100 parts by mass which is the total amount of the dichroic material and the polymer liquid crystal compound in the present composition. The durability of the light absorption anisotropic film is excellent in a case where the content of the polymerization initiator is 0.01 parts by mass or greater, and the degree of alignment of the light absorption anisotropic film is enhanced in a case where the content thereof is 30 parts by mass or less.

The liquid crystal composition may contain only one or two or more kinds of polymerization initiators. In a case where the liquid crystal composition contains two or more kinds of polymerization initiators, the content of the polymerization initiators indicates the total content of the polymerization initiators.

[Other Dichroic Materials]

The liquid crystal composition according to the embodiment of the present invention may further contain one or more dichroic materials (hereinafter, also referred to as "other dichroic materials") other than the above-described specific dichroic material.

Specific examples of other dichroic materials include those described in paragraphs [0067] to [0071] of JP2013-228706A, paragraphs [0008] to [0026] of JP2013-227532A, paragraphs [0008] to [0015] of JP2013-209367A, paragraphs [0045] to [0058] of JP2013-14883A, paragraphs [0012] to [0029] of JP2013-109090A, paragraphs [0009] to [0017] of JP2013-101328A, paragraphs [0051] to [0065] of JP2013-37353A, paragraphs [0049] to [0073] of JP2012-63387A, paragraphs [0016] to [0018] of JP1999-305036A (JP-H11-305036A), paragraphs [0009] to [0011] of JP2001-133630A, paragraphs [0030] to [0169] of JP2011-215337A, paragraphs [0021] to [0075] of JP2010-106242A, paragraphs [0011] to [0025] of JP2010-215846A, paragraphs [0017] to [0069] of JP2011-048311A, paragraphs [0013] to [0133] of JP2011-213610A, paragraphs [0074] to [0246] of JP2011-237513A, paragraphs [0005] to [0051] of JP2016-006502, paragraphs [0005] to [0041] of WO2016/060173A, paragraphs [0008] to [0062] of WO2016/136561A, paragraphs [0014] to [0033] of WO2017/154835A, paragraphs [0014] to [0033] of WO2017/154695A, paragraphs [0013] to [0037] of WO2017/195833A, and paragraphs [0014] to [0034] of WO2018/164252A.

In a case where the liquid crystal composition according to the embodiment of the present invention contains other dichroic materials, the content of the other dichroic materials is preferably in a range of 20 to 500 parts by mass and more preferably in a range of 30 to 300 parts by mass with respect to 100 parts by mass of the specific dichroic material in the liquid crystal composition.

The liquid crystal composition may contain only one or two or more kinds of other dichroic materials. In a case where the liquid crystal composition contains two or more kinds of other dichroic materials, the content of the other dichroic materials indicates the total content of the other dichroic materials.

[Light Absorption Anisotropic Film]

The light absorption anisotropic film according to the embodiment of the present invention is a light absorption anisotropic film formed of the liquid crystal composition according to the embodiment of the present invention described above.

Examples of a method for producing the light absorption anisotropic film according to the embodiment of the present invention include a method sequentially performing a step of coating a base material with the liquid crystal composition to form a coating film (hereinafter, also referred to as a "coating flint forming step") and a step of aligning the dichroic material contained in the coating film (hereinafter, also referred to as an "aligning step").

Hereinafter, each step of the production method of preparing the light absorption anisotropic film according to the embodiment of the present invention will be described.

[Coating Film Forming Step]

The coating film forming step is a step of coating a base material with the liquid crystal composition to form a coating film.

The base material is easily coated with the liquid crystal composition by using the liquid crystal composition containing the above-described solvent or using a liquid such as a melt obtained by heating the liquid crystal composition of the present invention.

Examples of the method of coating the base material with the liquid crystal composition include known methods such as a roll coating method, a gravure printing method, a spin coating method, a wire bar coating method, an extrusion coating method, a direct gravure coating method, a reverse gravure coating method, a die coating method, a spraying method, and an ink jet method.

In the present embodiment, an example in which the base material is coated with the liquid crystal composition has been described, but the present invention is not limited thereto, and for example, the alignment film provided on the base material may be coated with the liquid crystal composition. The details of the base material and the alignment film will be described below.

[Aligning Step]

The aligning step is a step of aligning the dichroic material contained in the coating film. In this manner, a light absorption anisotropic film is obtained.

The aligning step may include a drying treatment. Components such as a solvent can be removed from the coating film by performing the drying treatment. The drying treatment may be performed according to a method of allowing the coating film to stand at room temperature for a predetermined time (for example, natural drying) or a method of heating the coating film and/or blowing air to the coating film.

Here, the dichroic material contained in the liquid crystal composition may be aligned by performing the above-described coating film forming step or drying treatment. For example, in an embodiment in which the liquid crystal composition is prepared as a coating solution containing a solvent, a coating film having light absorption anisotropy (that is, a light absorption anisotropic film) is obtained by drying the coating film and removing the solvent from the coating film.

It is preferable that the aligning step includes a heat treatment. In this manner, since the dichroic material contained in the coating film can be aligned, the coating film after being subjected to the heat treatment can be suitably used as the light absorption anisotropic film.

From the viewpoint of the manufacturing suitability, the heat treatment is performed at a temperature of preferably 10° C. to 250° C. and more preferably 25° C. to 190° C. Further, the heating time is preferably in a range of 1 to 300 seconds and more preferably in a range of 1 to 60 seconds.

The aligning step may include a cooling treatment performed after the heat treatment. The cooling treatment is a treatment of cooling the coating film after being heated to room temperature (20° C. to 25° C.). In this manner, the alignment of the dichroic material contained in the coating film can be fixed. The cooling means is not particularly limited and can be performed according to a known method.

The light absorption anisotropic film can be obtained by performing the above-described steps.

In the present embodiment, examples of the method of aligning the dichroic material contained in the coating film include a drying treatment and a heat treatment, but the method is not limited thereto, and the dichroic material can be aligned by a known alignment treatment.

[Other Steps]

The method of producing the light absorption anisotropic film may include a step of curing the light absorption anisotropic film after the aligning step (hereinafter, also referred to as a "curing step").

The curing step is performed by, for example, heating the film and/or irradiating (exposing) the film with light, Between these, it is preferable that the curing step is performed by irradiating the film with light.

Various light sources such as infrared rays, visible light, and ultraviolet rays can be used as the light source for curing, but ultraviolet rays are preferable. In addition, ultraviolet rays may be applied while the film is heated during curing, or ultraviolet rays may be applied through a filter that transmits only a specific wavelength.

Further, the exposure may be performed under a nitrogen atmosphere. In a case where the curing of the light absorption anisotropic film proceeds by radical polymerization, since the inhibition of polymerization by oxygen is reduced, it is preferable that exposure is performed in a nitrogen atmosphere.

The film thickness of the light absorption anisotropic film is preferably in a range of 0.1 to 5.0 µm and more preferably in a range of 0.3 to 1.5 µm. Although it depends on the concentration of the dichroic material in the liquid crystal composition, a light absorption anisotropic film having an excellent absorbance is obtained in a case where the film thickness of the light absorption anisotropic film is 0.1 µm or greater, and a light absorption anisotropic film having an excellent transmittance is obtained in a case where the film, thickness thereof is 5.0 µm or less.

[Laminate]

The laminate according to the embodiment of the present invention includes a base material and the light absorption anisotropic film according to the embodiment of the present invention which is provided on the base material.

Further, the laminate according to the embodiment of the present invention may include a $\lambda/4$ plate on the light absorption anisotropic film or may include a barrier layer on the light absorption anisotropic film. Further, the laminate according to the embodiment of the present invention may include both a $\lambda/4$ plate and a barrier layer, and in this case, it is preferable that the laminate includes a barrier layer between the light absorption anisotropic film and the $\lambda/4$ plate.

Further, the laminate according to the embodiment of the present invention may include an alignment film between the base material and the light absorption anisotropic film.

Hereinafter, each layer constituting the laminate of the present invention will be described.

[Base Material]

The base material can be appropriately selected depending on the applications of the light absorption anisotropic film, and examples thereof include glass and a polymer film. The light transmittance of the base material is preferably 80% or greater.

In a case where a polymer film is used as the base material, it is preferable to use an optically isotropic polymer film. As specific examples and preferred embodiments of the polymer, the description in paragraph [0013] of JP2002-22942A can be applied. Further, even in a case of a polymer easily exhibiting the birefringence such as polycarbonate and polysulfone which has been known in the related art, a polymer with the exhibiting property which has been decreased by modifying the molecules described in WO2000/26705A can be used.

[Light Absorption Anisotropic Film]

The light absorption anisotropic film is as described above, and thus the description thereof will not be repeated.

[$\lambda/4$ Plate]

A "$\lambda/4$ plate" is a plate having a $\lambda/4$ function, specifically, a plate having a function of converting linearly polarized light having a specific wavelength into circularly polarized light (or converting circularly polarized light into linearly polarized light).

For example, specific examples of a form in which a $\lambda/4$ plate has a single-layer structure include a stretched polymer film and a phase difference film in which an optically anisotropic layer having a $\lambda/4$ function is provided on a support. Further, specific examples of a form in which a $\lambda/4$ plate has a multilayer structure include a broadband $\lambda/4$ plate obtained by laminating a $\lambda/4$ plate and a $\lambda/2$ plate.

The $\lambda/4$ plate and the light absorption anisotropic film may be provided by coming into contact with each other, or another layer may be provided between the $\lambda/4$ plate and the light absorption anisotropic film. Examples of such a layer include a pressure-sensitive adhesive layer or an adhesive layer for ensuring the adhesiveness, and a barrier layer.

[Barrier Layer]

In a case where the laminate according to the embodiment of the present invention includes a barrier layer, it is preferable that the barrier layer is provided between the light absorption anisotropic film and the $\lambda/4$ plate. Further, in a case where the laminate includes a layer other than the barrier layer (for example, a pressure-sensitive adhesive layer or an adhesive layer) between the light absorption anisotropic film and the $\lambda/4$ plate, the barrier layer can be provided, for example, between the light absorption anisotropic film and the layer other than the barrier layer.

The barrier layer is also referred to as a gas blocking layer (oxygen blocking layer) and has a function of protecting the light absorption anisotropic film from gas such as oxygen in the atmosphere, the moisture, or the compound contained in an adjacent layer.

The barrier layer can refer to, for example, the description in paragraphs [0014] to [0054] of JP2014-159124A, paragraphs [0042] to [0075] of JP2017-121721A, paragraphs [0045] to [0054] of JP2017-115076A, paragraphs [0010] to [0061] of JP2012-213938A, and paragraphs [0021] to [0031] of JP2005-169994A.

[Alignment Film]

The laminate according to the embodiment of the present invention may include an alignment film between the base material and the light absorption anisotropic film.

The alignment film may be any layer as long as the dichroic material contained in the liquid crystal composition according to the embodiment of the present invention can be in a desired alignment state on the alignment film.

An alignment layer can be provided by means such as a rubbing treatment performed on a film surface of an organic compound (preferably a polymer), oblique vapor deposition of an inorganic compound, formation of a layer having microgrooves, or accumulation of an organic compound (such as ω-tricosanoic acid, dioctadecylmethylammonium chloride, or methyl stearylate) according to a Langmuir-Blodgett method (LB film). Further, an alignment film in which an alignment function is generated by application of an electric field, application of a magnetic field, or irradiation with light is also known. Among these, in the present invention, an alignment film formed by performing a rubbing treatment is preferable from the viewpoint of easily controlling the pretilt angle of the alignment film, and a photo-alignment film formed by irradiation with light is also preferable from the viewpoint of the uniformity of alignment.

The alignment film may function as the barrier layer described above.

<Rubbing Treatment Alignment Film>

A polymer material used for the alignment film formed by performing a rubbing treatment is described in multiple documents, and a plurality of commercially available products can be used. In the present invention, polyvinyl alcohol or polyimide and derivatives thereof are preferably used. The alignment film can refer to the description on page 43, line 24 to page 49, line 8 of WO2001/88574A1. The thickness of the alignment film is preferably in a range of 0.01 to 10 μm and more preferably in a range of 0.01 to 1 μm.

<Photo-Alignment Film>

A photo-alignment material used for an alignment film formed by irradiation with light is described in a plurality of documents. In the present invention, preferred examples thereof include azo compounds described in JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B, aromatic ester compounds described in JP2002-229039A, maleimide and/or alkenyl-substituted nadiimide compounds having a photo-alignment unit described in JP2002-265541A and JP2002-317013A, photocrosslinkable silane derivatives described in JP4205195B and JP4205198B, photocrosslinkable polyamides, polyamides, or esters described in JP2003-520878A, JP2004-529220A, and JP4162850B. Among these, azo compounds, photocrosslinkable polyimides, polyamides, or esters are more preferable.

The photo-alignment film formed of the above-described material is irradiated with linearly polarized light or non-polarized light to produce a photo-alignment film.

In the present specification, the "irradiation with linearly polarized light" and the "irradiation with non-polarized light" are operations for causing a photoreaction in the photo-alignment material. The wavelength of the light to be used varies depending on the photo-alignment material to be used and is not particularly limited as long as the wavelength is required for the photoreaction. The peak wavelength of light to be used for irradiation, with light is preferably in a range of 200 nm to 700 nm, and ultraviolet light having a peak wavelength of 400 nm or less is more preferable.

Examples of the light source used for irradiation with light include commonly used light sources, for example, lamps such as a tungsten lamp, a halogen lamp, a xenon lamp, a xenon flash lamp, a mercury lamp, a mercury xenon lamp, or a carbon arc lamp, various lasers [such as a semiconductor laser, a helium neon laser, an argon ion laser, a helium cadmium laser, and a yttrium aluminum garnet (YAG) laser], a light emitting diode, and a cathode ray tube.

As means for obtaining linearly polarized light, a method of using a polarizing plate (for example, an iodine polarizing plate, a dichroic dye polarizing plate, or a wire grid polarizing plate), a method of using a prism-based element (for example, a Glan-Thompson prism) or a reflective type polarizer for which a Brewster's angle is used, or a method of using light emitted from a laser light source having polarized light can be employed. In addition, only light having a required wavelength may be selectively applied using a filter or a wavelength conversion element.

In a case where light to be applied is linearly polarized light, a method of applying light vertically or obliquely to the upper surface with respect to the alignment film or the surface of the alignment film from the rear surface is employed. The incidence angle of light varies depending on the photo-alignment material, but is preferably in a range of 0 to 90° (vertical) and more preferably in a range of 40 to 90°.

In a case where light to be applied is non-polarized light, the alignment film is irradiated with non-polarized light obliquely. The incidence angle is preferably in a range of 10 to 80°, more preferably in a range of 20 to 60°, and still more preferably in a range of 30 to 50°.

The irradiation time is preferably in a range of 1 minute to 60 minutes and more preferably in a range of 1 minute to 10 minutes.

In a case where patterning is required, a method of performing irradiation with light using a photomask as many times as necessary for pattern preparation or a method of writing a pattern by laser light scanning can be employed.

[Applications]

The laminate according to the embodiment of the present invention can be used as a polarizing element (polarizing plate) or the like, for example, as a linearly polarizing plate or a circularly polarizing plate.

In a case where the laminate of the present invention does not include an optically anisotropic layer such as the λ/4 plate, the laminate can be used as a linearly polarizing plate.

Meanwhile, in a case where the laminate of the present invention includes the λ/4 plate, the laminate can be used as a circularly polarizing plate.

[Image Display Device]

An image display device according to the embodiment of the present invention includes the above-described light absorption anisotropic film or the above-described laminate.

The display element used in the image display device according to the embodiment of the present invention is not particularly limited, and examples thereof include a liquid crystal cell, an organic electroluminescence (hereinafter, abbreviated as "EL") display panel, and a plasma display panel.

Among these, a liquid crystal cell or an organic EL display panel is preferable, and a liquid crystal cell is more preferable. That is, in the image display device of the present invention, a liquid crystal display device obtained by using a liquid crystal cell as a display element or an organic EL display device obtained by using an organic EL display panel as a display element is preferable, and a liquid crystal display device is more preferable.

[Liquid Crystal Display Device]

As a liquid crystal display device which is an example of the image display device according to the embodiment of the present invention, a form of a liquid crystal display device including the above-described light absorption anisotropic film and a liquid crystal cell is preferably exemplified. A liquid crystal display device including the above-described laminate (here, the laminate does not include a λ/4 plate) and a liquid crystal cell is more suitable.

In the present invention, between the light absorption anisotropic films (laminate) provided on both sides of the liquid crystal cell, it is preferable that the light absorption anisotropic film (laminate) according to the embodiment of the present invention is used as a front-side polarizing element and more preferable that the light absorption anisotropic film (laminate) according to the embodiment of the present invention is used as a front-side polarizing element and a rear-side polarizing element.

Hereinafter, the liquid crystal cell constituting the liquid crystal display device will be described in detail.

<Liquid Crystal Cell>

It is preferable that the liquid crystal cell used for the liquid crystal display device is in a vertical alignment (VA) mode, an optically compensated bend (OCB) mode, an in-plane-switching (IPS) mode, or a twisted nematic (TN) mode, but the present invention is not limited thereto.

In the liquid crystal cell in a TN mode, rod-like liquid crystalline molecules are substantially horizontally aligned at the time of no voltage application and further twisted aligned at 60° to 120°. The liquid crystal cell in a TN mode is most likely used as a color thin film transistor (TFT) liquid crystal display device and is described in multiple documents.

In the liquid crystal cell in a VA mode, rod-like liquid crystalline molecules are substantially vertically aligned at the time of no voltage application. The concept of the liquid crystal cell in a VA mode includes (1) a liquid crystal cell in a VA mode in a narrow sense where rod-like liquid crystalline molecules are aligned substantially vertically at the time of no voltage application and substantially horizontally at the time of voltage application (described in JP1990-176625A (JP-H02-176625A)), (2) a liquid crystal cell (in an MVA mode) (SID97, described in Digest of tech. Papers (proceedings) 28 (1997) 845) in which the VA mode is formed to have multi-domain in order to expand the viewing angle, (3) a liquid crystal cell in a mode (n-ASM mode) in which rod-like liquid crystal molecules are substantially vertically aligned at the time of no voltage application and twistedly multi-domain aligned at the time of voltage application (described in proceedings of Japanese Liquid Crystal Conference, p. 58 to 59 (1998)), and (4) a liquid crystal cell in a SURVIVAL mode (presented at LCD International 98). Further, the liquid crystal cell may be of any of a patterned vertical alignment (PVA) type, a photo-alignment (optical alignment) type, or a polymer-sustained alignment (PSA) type. Details of these modes are described in JP2006-215326A and JP2008-538819A.

In the liquid crystal cell in an IPS mode, rod-like liquid crystal molecules are aligned substantially parallel to the substrate, and the liquid crystal molecules respond planarly through application of an electric field parallel to the substrate surface. In the IPS mode, black display is carried out in a state where no electric field is applied, and absorption axes of a pair of upper and lower polarizing plates are orthogonal to each other. A method of reducing leakage light during black display in an oblique direction and improve the viewing angle using an optical compensation sheet is disclosed in JP1998-54982A (JP-10-54982A), JP1999-202323A (JP-H11-202323A), JP1997-292522A (JP-19-292522A), JP1999-133408A, (JP-H11-133408A), JP1999-305217A (JP-H11-305217A), and JP1998-307291A (JP-H10-307291A).

[Organic EL Display Device]

As an organic EL display device which is an example of the image display device according to the embodiment of the present invention, a form of an image display device including a light absorption anisotropic film, a λ/4 plate, and an organic EL display panel in this order from the viewing side is suitably exemplified.

A form of an image display device including the above-described laminate including a λ/4 plate and an organic EL display panel in this order from the viewing side is more suitably exemplified. In this case, the laminate is formed such that a base material, an alignment film provided as necessary, a light absorption anisotropic film, a barrier layer provided as necessary, and a λ/4 plate are disposed in this order from the viewing side.

Further, the organic EL display panel is a display panel formed using an organic EL element having an organic light-emitting layer (organic electroluminescence layer) interposed between electrodes (between a cathode and an anode). The configuration of the organic EL display panel is not particularly limited, and a known configuration is employed.

EXAMPLES

Hereinafter, the present invention will be described in more detail with reference to examples. Materials, used amounts, ratios, treatment contents, treatment procedures, and the like described in the following examples can be appropriately changed without departing from the spirit of the present invention. Therefore, the scope of the present invention should not be limitatively interpreted by the following examples.

Synthesis Example 1

A dichroic material D1 was synthesized in the following manner.

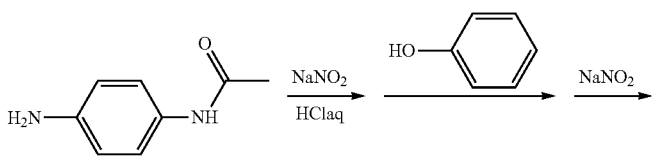

-continued

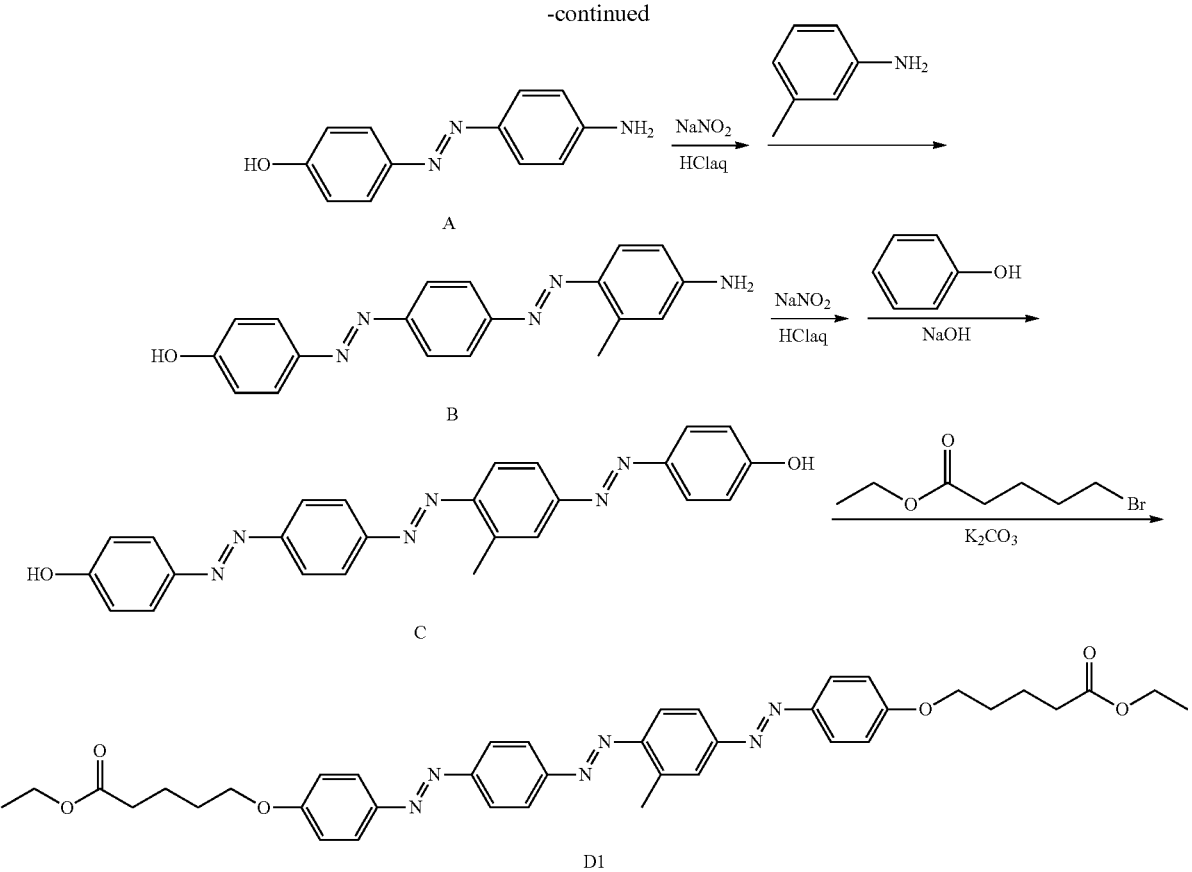

A compound A represented by Formula A was synthesized according to the literature (Chem. Eur. J. 2004. 10. 2011).

The compound A (10 g) was dissolved in water (300 mL) and hydrochloric acid (17 mL), the solution was cooled in an ice bath, sodium nitrite (3.3 g) was added thereto, and the resulting solution was stirred for 30 minutes. Further, m-toluidine (5.1 g) was added thereto after amidosulfuric acid (0.5 g) was further added thereto, and the solution was stirred at room temperature for 1 hour. After the solution was stirred, the solid obtained by neutralization with hydrochloric acid was collected by suction filtration, thereby obtaining a compound B (3.2 g) represented by Formula B.

Next, the compound B (1 g) was dissolved in tetrahydrofuran (30 mL), water (10 mL), and hydrochloric acid (1.6 mL), the solution was cooled in an ice bath, sodium nitrite (0.3 g) was added thereto, the resulting solution was stirred for 30 minutes, and amidosulfuric acid (0.5 g) was further added thereto. Separately, phenol (0.4 g) was dissolved in potassium carbonate (2.76 g) and water (50 mL), the solution was cooled in an ice bath, the above-described THF solution was added dropwise thereto, and the resulting solution was stirred at room temperature for 1 hour. After the solution was stirred, water (200 mL) was added, and the obtained compound C (1.7 g) was suction-filtered.

Next, the compound C (0.6 g), ethyl-5-bromovalerate (0.7 g) (manufactured by Tokyo Chemical Industry Co., Ltd.), and potassium carbonate (0.5 g) were dissolved in N,N-dimethylacetamide (DMAc) (10 mL), and the solution was stirred at 85° C. for 3.5 hours. After the solution was stirred, methanol (100 mL) was added thereto, the obtained solid was suction-filtered, thereby obtaining a dichroic material D1 (0.9 g).

The dichroic material D1 was yellow powder and had a maximum absorption wavelength of 420 nm. Further, the maximum absorption wavelength of the dichroic material D1 was measured by a spectrophotometer (product name, UV-3100, manufactured by Shimadzu Corporation) using a sample in which the dichroic material D1 was dissolved in chloroform.

Synthesis Example 2

A dichroic material D2 was synthesized in the following manner.

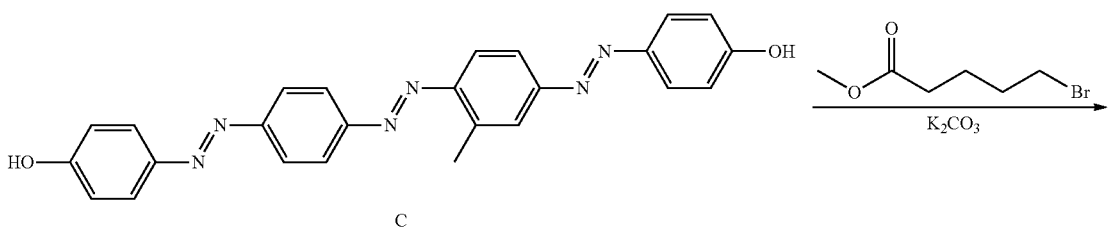

-continued

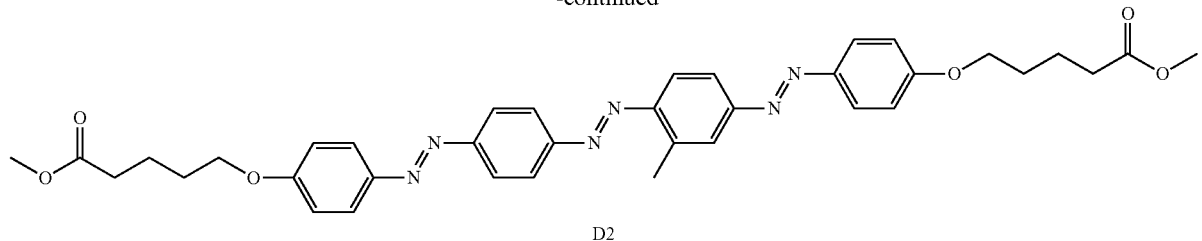

D2

The compound C (0.8 g) obtained by the above-described method, methyl-5-bromovalerate (0.8 g) (manufactured by Tokyo Chemical Industry Co., Ltd.), and potassium carbonate (0.6 g) were dissolved in DMAc (10 mL), and the solution was stirred at 85° C. for 3.5 hours. After the solution was stirred, methanol (100 mL) was added thereto, the obtained solid was suction-filtered, thereby obtaining a dichroic material D2 (0.9 g).

The dichroic material D2 was yellow powder and had a maximum absorption wavelength of 420 nm. Further, the maximum absorption wavelength of the dichroic material D2 was measured in the same manner as that for the dichroic material D1.

Synthesis Example 3

A dichroic material D7 was synthesized in the following manner.

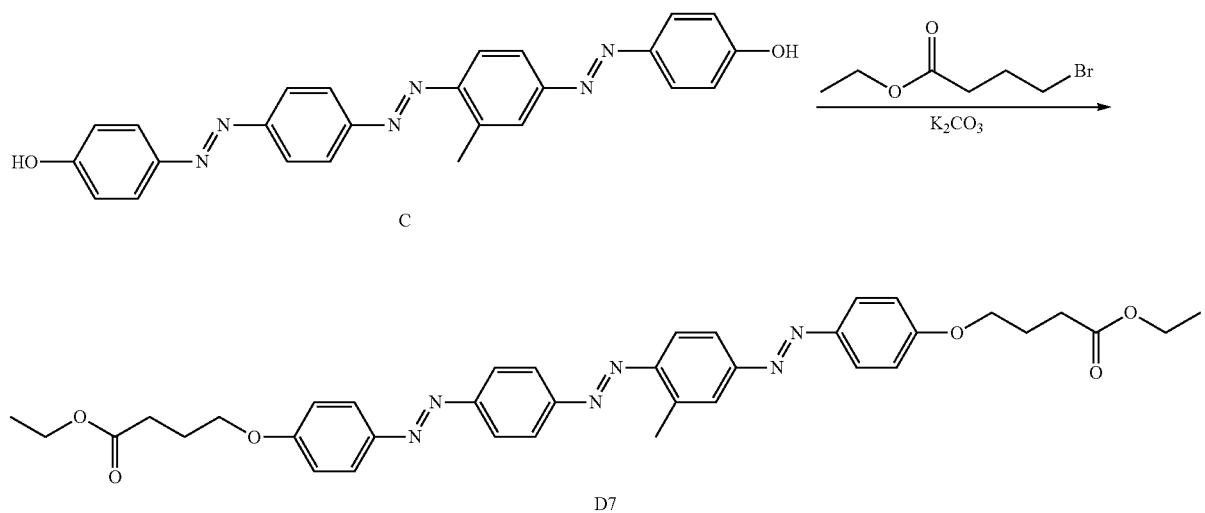

D7

The compound C (0.8 g) obtained by the above-described method, ethyl-4-bromobutanoate (0.8 g) (manufactured by Tokyo Chemical Industry Co., Ltd.), and potassium carbonate (0.6 g) were dissolved in DMAc (10 mL), and the solution was stirred at 85° C. for 3.5 hours. After the solution was stirred, methanol (100 mL) was added thereto, the obtained solid was suction-filtered, thereby obtaining a dichroic material D7 (0.9 g).

The dichroic material D7 was yellow powder and had a maximum absorption wavelength of 419 nm. Further, the maximum absorption wavelength of the dichroic material D7 was measured in the same manner as that for the dichroic material D1.

Synthesis Example 4

A dichroic material D9 was synthesized in the following manner.

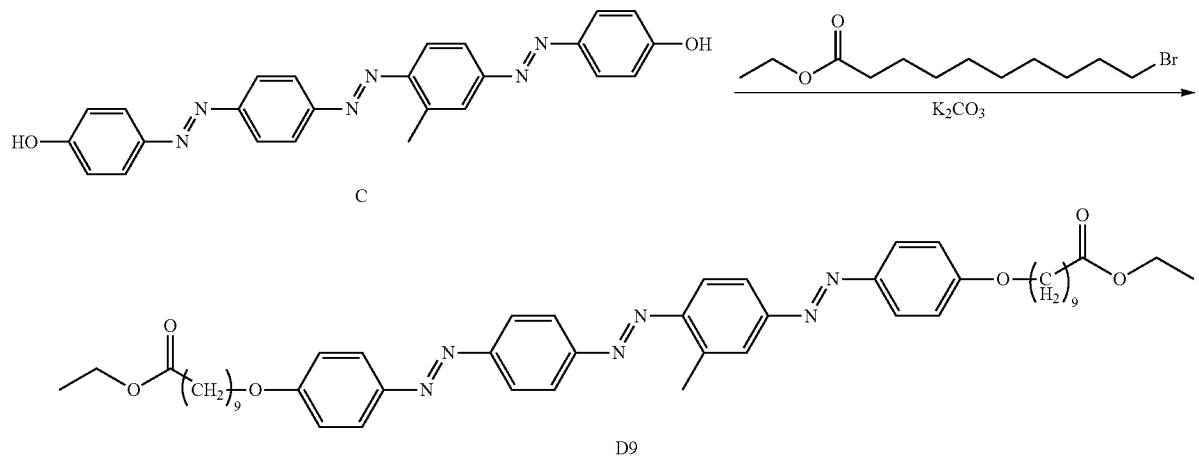

A raw material ethyl-10-bromodecanoate was synthesized in conformity with the method described in Journal Medicinal Chemistry, Vol. 55, pp. 7163 to 7172 (2012).

The compound C (0.8 g) obtained by the above-described method, ethyl-10-bromodecanoate (1.4 g), and potassium carbonate (0.6 g) were dissolved in DMAc (10 mL), and the solution was stirred at 85° C. for 15 hours. After the solution was stirred, methanol (100 mL) was added thereto, the obtained solid was suction-filtered, thereby obtaining a dichroic material D9 (1.1 g).

The dichroic material D9 was yellow powder and had a maximum absorption wavelength of 420 m. Further, the maximum absorption wavelength of the dichroic material D9 was measured in the same manner as that for the dichroic material D1.

Synthesis Example 5

A dichroic material D12 was synthesized in the following manner.

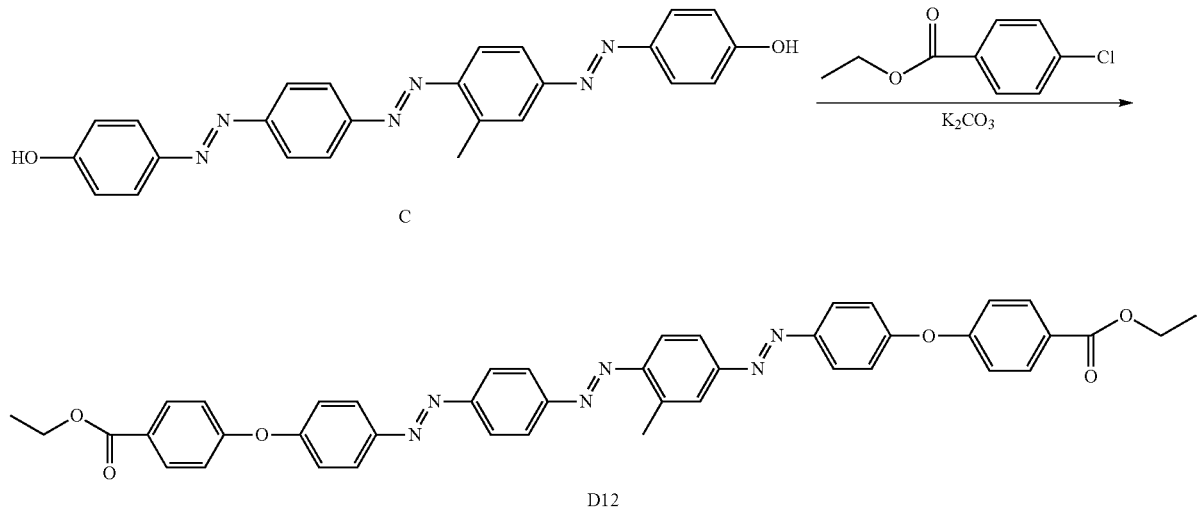

The compound C (0.8 g) obtained by the above-described method, ethyl-4-chlorobenzoate (1.3 g) (manufactured by Tokyo Chemical Industry Co., Ltd.), and potassium carbonate (0.6 g) were dissolved in DMAc (10 mL), and the solution was stirred at 85° C. for 3.5 hours. After the solution was stirred, methanol (100 mL) was added thereto, the obtained solid was suction-filtered, thereby obtaining a dichroic material D12 (1.0 g).

The dichroic material D12 was yellow powder and had a maximum absorption wavelength of 412 nm. Further, the maximum absorption wavelength of the dichroic material D12 was measured in the same manner as that for the dichroic material D1.

Synthesis Example 6

A dichroic material E1 was synthesized in the following manner.

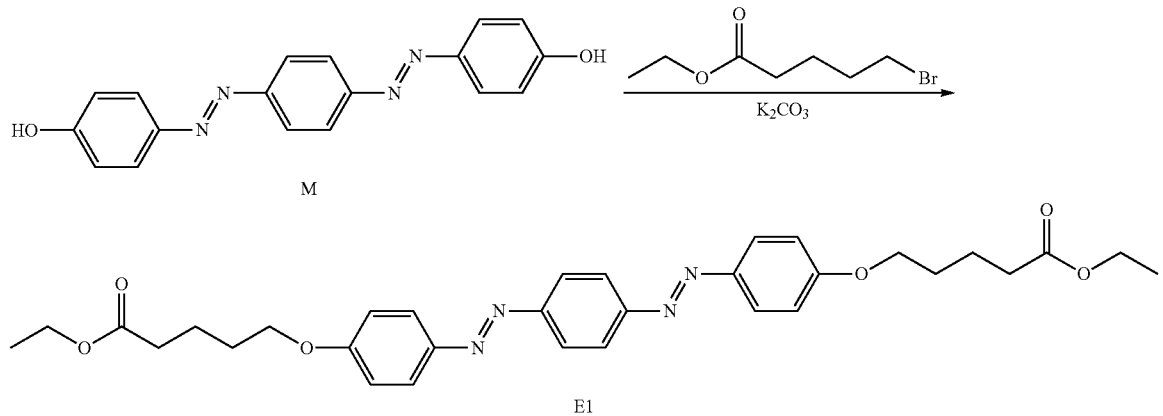

A compound M represented by Formula M was synthesized in conformity with the method described in WO2017/195833A.

The compound M (0.5 g), ethyl-5-bromovalerate (0.7 g) (manufactured by Tokyo Chemical Industry Co., Ltd.), and potassium carbonate (0.5 g) were dissolved in DMAc (10 mL), and the solution was stirred at 85° C. for 3.5 hours. After the solution was stirred, methanol (100 mL) was added thereto, the obtained solid was suction-filtered, thereby obtaining a dichroic material E1 (0.7 g).

The dichroic material E1 was yellow powder and had a maximum absorption wavelength of 395 nm. Further, the maximum absorption wavelength of the dichroic material E1 was measured in the same manner as that for the dichroic material D1.

Synthesis Example 7

A dichroic material E2 was synthesized in the following manner.

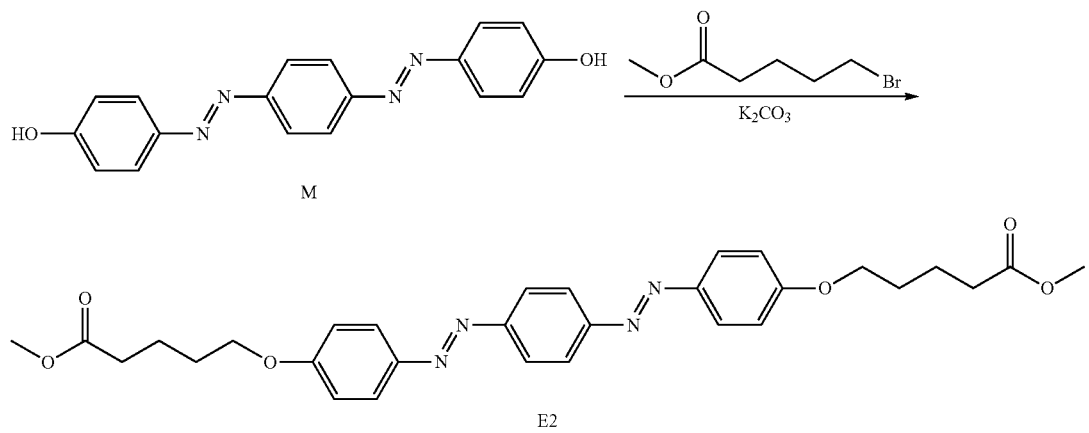

The compound M (0.5 g), methyl-5-bromovalerate (0.6 g) (manufactured by Tokyo Chemical Industry Co., Ltd.), and potassium carbonate (0.5 g) were dissolved in DMAc (10 mL), and the solution was stirred at 85° C. for 3.5 hours. After the solution was stirred, methanol (100 mL) was added thereto, the obtained solid was suction-filtered, thereby obtaining a dichroic material E2 (0.6 g).

The dichroic material E2 was yellow powder and had a maximum absorption wavelength of 395 mu. Further, the maximum absorption wavelength of the dichroic material E2 was measured in the same manner as that for the dichroic material D1.

Synthesis Example 8

A dichroic material F1 was synthesized in the following manner.

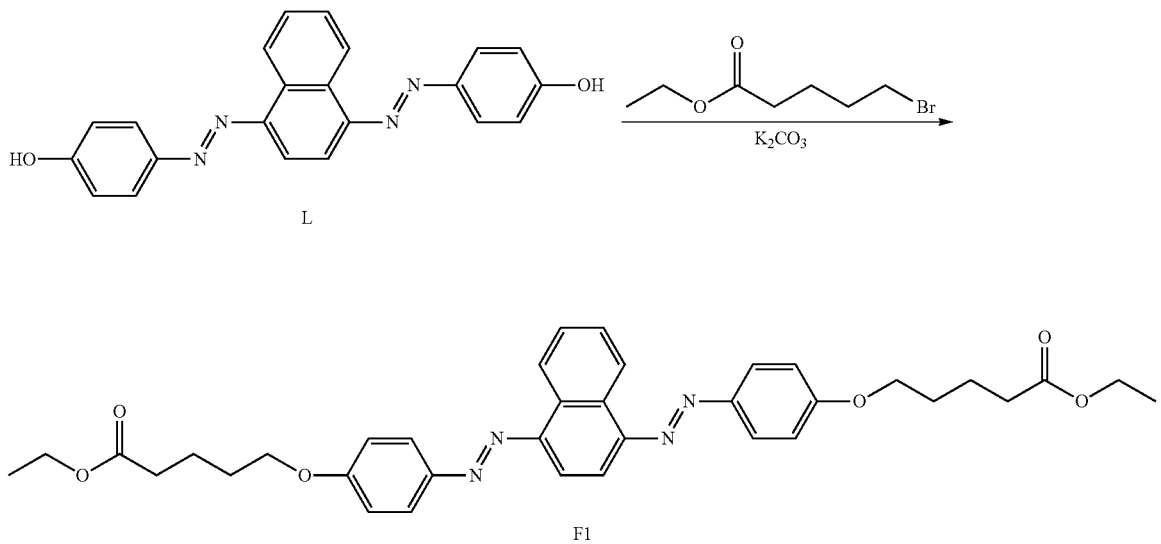

A raw material L was synthesized in conformity with the method described in Journal Chemistry of Society, Vol. 43, p. 439 (1883).

The compound L (1.0 g) obtained by the above-described method, ethyl-5-bromovalerate (0.6 g) (manufactured by Tokyo Chemical Industry Co., Ltd.), and potassium carbonate (0.6 g) were dissolved in DMAc (10 mL), and the solution was stirred at 85° C. for 3.5 hours. After the solution was stirred, methanol (100 ml) was added thereto, the obtained solid was suction-filtered, thereby obtaining a dichroic material F1 (1.2 g).

The dichroic material F1 was yellow powder and had a maximum absorption wavelength of 430 nm. Further, the maximum absorption wavelength of the dichroic material F1 was measured in the same manner as that for the dichroic material D1.

Example 1

A light absorption anisotropic film was prepared by coating the alignment film prepared as follows with a liquid crystal composition of Example 1 described below.

[Preparation of Alignment Film]

A glass base material (manufactured by Central Glass Co., Ltd., blue plate glass, size of 300 mm×300 mm, thickness of 1.1 mm) was washed with an alkaline detergent, pure water was poured thereinto, and the glass base material was dried.

The dried glass base material was coated with the following alignment film-forming composition 1 using a #12 bar, and the applied alignment film-forming composition 1 was dried at 110° C. for 2 minutes to form a coating film on the glass base material.

The obtained coating film was subjected to a rubbing treatment (roller rotation speed: 1000 rotations/spacer thickness of 2.9 mm, stage speed of 1.8 m/min) once to prepare an alignment film on the glass base material.

---

Composition of alignment film-forming composition 1

Modified vinyl alcohol (see Formula (PVA-1)): 2.00 parts by mass
Water: 74.08 parts by mass
Methanol: 23.86 parts by mass
Photopolymerization initiator (IRGACURE 2959, manufactured by BASF SE): 0.06 parts by mass

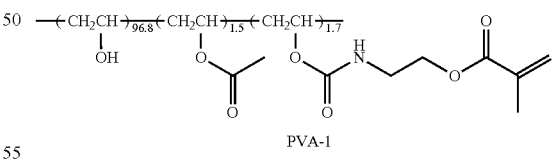

PVA-1

---

[Preparation of Light Absorption Anisotropic Film]

The obtained alignment film was spin-coated with the colored composition 1 of Example 1 (see the composition described below) using a spin coater at a rotation speed of 500 rotations/30 seconds and dried at room temperature for 30 seconds to form a coating film on the alignment film. Subsequently, the coating film was heated at 140° C. for 15 seconds and exposed to LV (ultraviolet) rays (300 mJ), thereby obtaining a laminate in which the light absorption anisotropic film was formed on the alignment film.

| Composition of the liquid crystal composition of Example 1 |
| --- |
| Liquid crystal compound L1 (see Formula (L1) shown below): 2.33 parts by mass |
| Dichroic material D1 (see Formula (D1) shown above): 0.93 parts by mass |
| Dichroic material C1 (see Formula (C1) shown below): 0.77 parts by mass |
| Dichroic material C2 (see Formula (C2) shown below): 1.06 parts by mass |
| Photopolymerization initiator (IRGACURE 819, manufactured by BASF SE): 0.37 parts by mass |
| Interface improver S1 (see Formula (S1) shown below): 0.20 parts by mass |
| Cyclopentanone (solvent): 54.35 parts by mass |
| Tetrahydrofuran (solvent): 40.00 parts by mass |

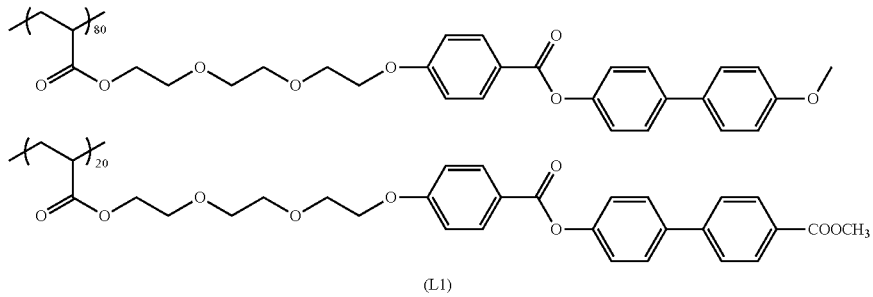

(L1)

In Formula (L1), each numerical value in parentheses of the repeating unit indicates the content (% by mass) of the repeating unit contained in the liquid crystal compound L1.

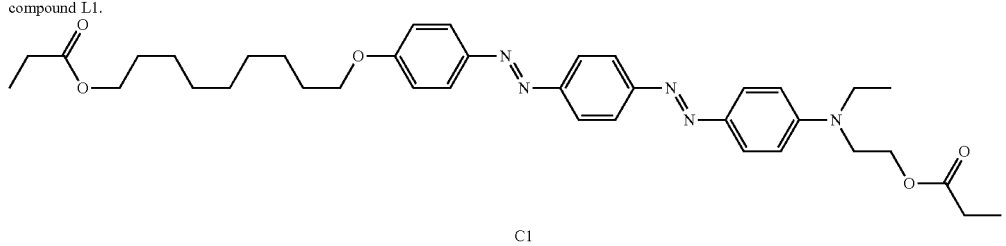

C1

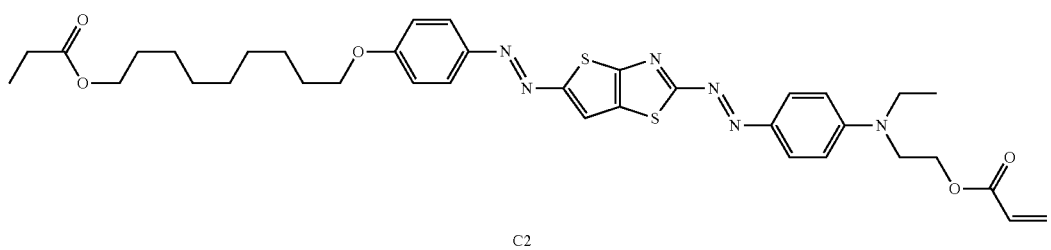 [SMILES: C=CC(=O)OCCN(CC)c1ccc(/N=N/c2nc3sc(/N=N/c4ccc(OCCCCCCCCCOC(=O)CC)cc4)cc3s2)cc1 ; "C2"]

C2

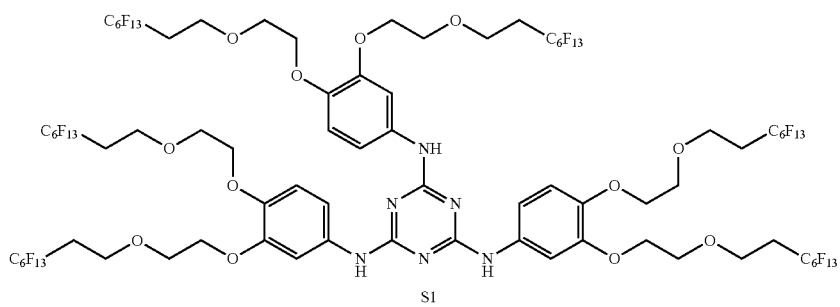

S1

Examples 2 to 9 and Comparative Examples 1 to 3

Laminates including light absorption anisotropic films of Examples 2 to 9 and Comparative Examples 1 to 3 were prepared in the same manner as in Example 1 except that the liquid crystal compositions of Examples 2 to 16 and Comparative Examples 1 to 3 were used.

Here, the liquid crystal compositions of Examples 2 to 9 and Comparative Examples 1 to 3 each have the same composition as the liquid crystal composition of Example 1 except that the kinds of the dichroic material and the liquid crystal compound contained in the liquid crystal composition of Example 1 were changed as listed in Table 1.

Further, the structures of the liquid crystal compound L2 and the dichroic materials H1 to H13 are as follows.

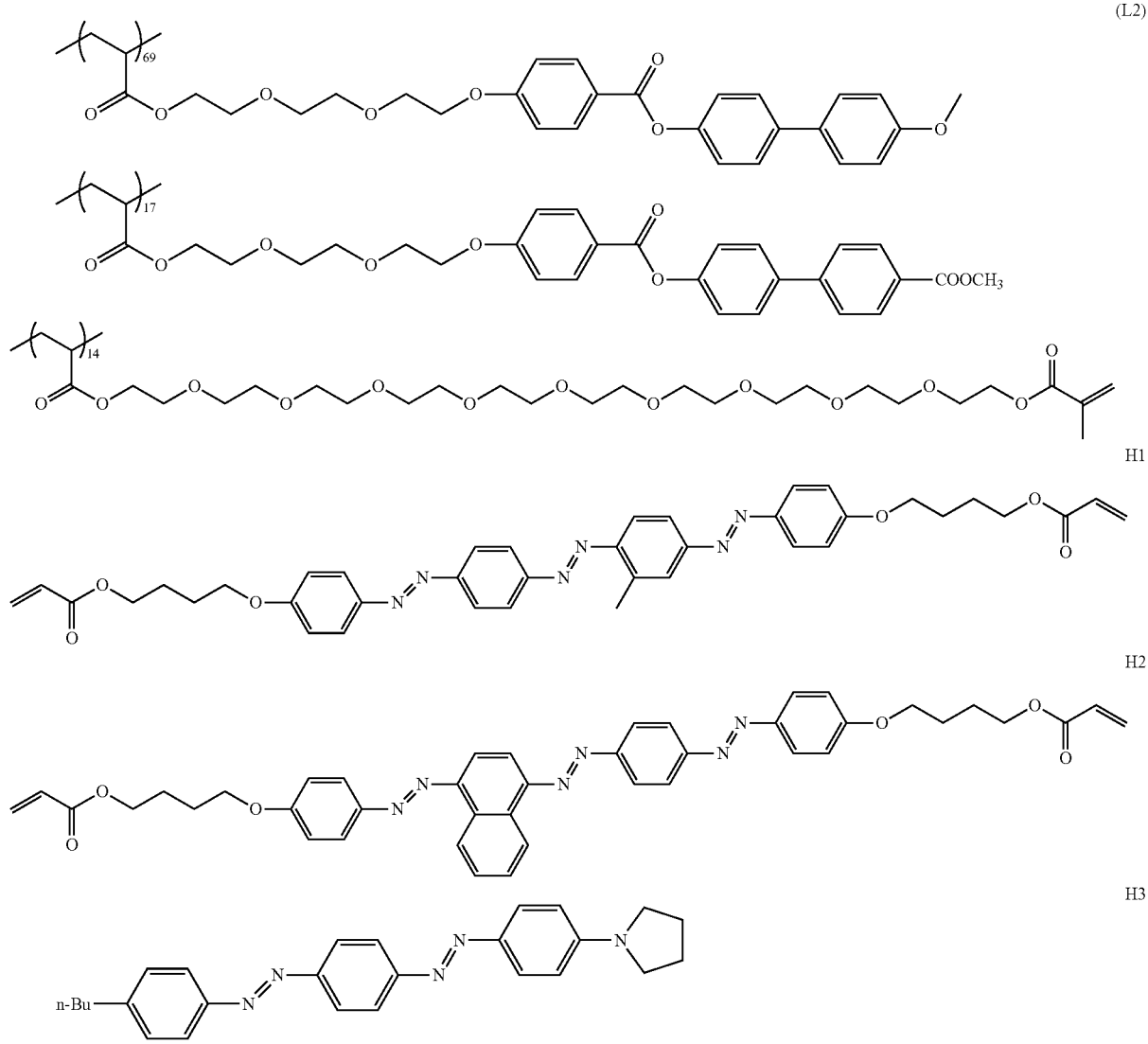

In Formula (L2), each numerical value in parentheses of the repeating unit indicates the content (% by mass) of the repeating unit contained in the liquid crystal compound L2.

Further, in Formula (H3), n-Bu indicates a normal butyl group.

[Measurement of Degree of Alignment Before Light Resistance Test]

Each of the light absorption anisotropic film of the laminates of the examples and the comparative examples was coated with the alignment film-forming composition 1 described above using a #12 bar, and the film coated with the composition was dried at 110° C. for 2 minutes, thereby preparing an evaluation sample.

Each evaluation sample was set on a sample table in a state in which a linear polarizer was inserted on a light source side of an optical microscope (product name, "ECLIPSE E600 POL", manufactured by Nikon Corporation), the absorbance of the light absorption anisotropic film in a wavelength range of 380 nm to 780 nm was measured at a pitch of 1 nm using a multi-channel spectrometer (product name, "QE65000", manufactured by Ocean Optics, Inc.), and the degrees of alignment in a wavelength range of 400 nm to 500 nm was calculated as an average value according to the following equation. The results are listed in Table 1.

Degree of alignment: $S = ((Az0/Ay0) - 1)/((Az0/Ay0) + 2)$

Az0: Absorbance of light absorption anisotropic film with respect to polarized light in absorption axis direction Ay0: Absorbance of light absorption anisotropic film with respect to polarized light in polarization axis direction

[Measurement of Degree of Alignment after Light Resistance Test]

The light resistance test was performed by setting each of the laminates of the examples and the comparative examples in a light resistance tester (trade name "Sunshine Carbon Arc Lamp type Weather Resistance Tester", manufactured by Suga Test Instruments Co., Ltd.) and irradiating the surface of the laminate on which the light absorption anisotropic film was formed with light from the carbon arc light source under the conditions of 120000 lux for 200 hours (equivalent to an integrated light quantity of 24000000 lux·h). Further, the carbon arc light source was provided with a 370 nm ultraviolet cut filter.

An evaluation sample was prepared according to the same procedures as in the "measurement of degree of alignment before light resistance test" described above except that the laminate after the light resistance test was used, and the degree of alignment of the obtained evaluation sample was calculated according to the same procedures as in the "measurement of degree of alignment before light resistance test" described above". The results are listed in Table 1.

The light resistance of the light absorption anisotropic film is more excellent as the rate of decrease in the degree of alignment after the light resistance test is smaller.

TABLE 1

|  | Dichroic material Type | Liquid crystal compound Type | Degree of alignment before light fastness test | Degree of alignment after light fastness test |
|---|---|---|---|---|
| Example 1 | D1 | L1 | 0.972 | 0.969 |
| Example 2 | D2 | L1 | 0.965 | 0.961 |
| Example 3 | D7 | L1 | 0.964 | 0.960 |
| Example 4 | D9 | L1 | 0.955 | 0.950 |
| Example 5 | D12 | L1 | 0.936 | 0.929 |
| Example 6 | E1 | L1 | 0.938 | 0.930 |
| Example 7 | E2 | L1 | 0.933 | 0.925 |
| Example 8 | F1 | L1 | 0.948 | 0 938 |
| Example 9 | D1 | L2 | 0.965 | 0.960 |
| Comparative Example 1 | H1 | L1 | 0.955 | 0.715 |
| Comparative Example 2 | H2 | L1 | 0.935 | 0.680 |
| Comparative Example 3 | H3 | L1 | 0.890 | 0.450 |

As listed in Table 1, it was found that a light absorption anisotropic film having excellent light resistance is obtained in a case of using the liquid crystal composition containing a dichroic material having a structure represented by Formula (1) (examples).

Based on the comparison of Examples 1 to 8, it was found that a light absorption anisotropic film having a small change in degree of alignment before and after the light resistance test and having excellent light resistance is obtained in a case of using the dichroic material (Examples 1 to 7) in which $Ar_1$, $Ar_2$, and $Ar_3$ in Formula (1) all represent a phenylene groups, as compared with a case of using the dichroic material (Example 8) that does not satisfy this condition.

Based on the comparison of Examples 1 to 7, it was found that a light absorption anisotropic film having a small change in degree of alignment before and after the light resistance test and having excellent light resistance is obtained in a case of using the dichroic material (Examples 1 to 5) in which k in Formula (1) represents 2, as compared with a case of using the dichroic material (Examples 6 and 7) that does not satisfy this condition.

Based on the comparison of Examples 1 to 5, it was found that a light absorption anisotropic film having a small change in degree of alignment before and after the light resistance test and having excellent light resistance is obtained in a case of using the dichroic material (Examples 1 to 3) in which in Formula (1), $L_1$ represents a linear or branched alkylene group having 2 to 6 carbon atoms in a case of "m1=1" and $L_2$ represents a linear or branched alkylene group having 2 to 6 carbon atoms in a case of "m2=1", as compared with a case of using the dichroic material (Examples 4 and 5) that does not satisfy this condition.

On the contrary, it was found that the light resistance of the light absorption anisotropic film is deteriorated in a case of using the liquid crystal composition that contains no dichroic material having a structure represented by Formula (1) (comparative examples).

[Bending Resistance Test]

A laminate of Example A1 was produced in the same manner as in Example 1 except that a polyester film was used in place of the glass base material as the base material used for forming the alignment film.

Further, a laminate of Example A9 was produced in the same manner as in Example 9 except that a polyester film was used instead of the glass base material as the base material used for forming the alignment film.

Next, evaluation samples obtained by cutting the laminates of Example A1 and Example A9 into a size of 15 mm in width and 150 nm in length were prepared.

The number of times required to break each evaluation sample was measured by a method in conformity with JIS P 8115 (2001) under the conditions of a temperature of 25° C. and a load of 500 g using a folding resistance tester (M1T, BE-201 type, manufactured by Tester Sangyo Co., Ltd., curvature radius on bending: 0.38 mm). The bending resistance and the resistance to repeated folding are more excellent as the number of times required until the breakage increases.

The laminate of Example A1 broke when the number of times of bending was less than 1000, whereas the laminate of Example A9 was not broken even when the number of times of bending reached 1000. Therefore, it was found that a light absorption anisotropic film with excellent bending resistance is obtained as compared with a case where the liquid crystal composition containing a liquid crystal compound that contains a crosslinkable group at the terminal was used (Example A9) or a case where the liquid crystal composition containing a liquid crystal compound that contains no crosslinkable group at the terminal was used (Example A1)

What is claimed is:
1. A liquid crystal composition comprising:
a liquid crystal compound; and
a dichroic material having a structure represented by Formula (1),

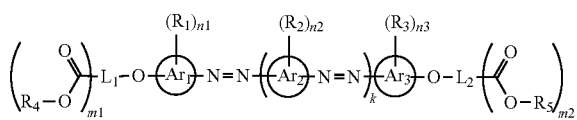

(1)

in Formula (1), $Ar_1$ represents a (n1+2)-valent aromatic hydrocarbon group or heterocyclic group, $Ar_2$ represents a (n2+2)-valent aromatic hydrocarbon group or heterocyclic group, and $Ar_3$ represents a (n3+2)-valent aromatic hydrocarbon group or heterocyclic group, in Formula (1), $R_1$, $R_2$, and $R_3$ each independently represent a monovalent substituent, a plurality of $R_1$'s may be the same as or different from each other in a case of "n1≥2", a plurality of $R_2$'s may be the same as or different from each other in a case of "n2≥2", and a plurality of $R_3$'s may be the same as or different from each other in a case of "n3≥2", in Formula (1), k represents 1 or 2, in a case of "k=2", a plurality of $Ar_2$'s may be the same as or different from each other and a plurality of $R_2$'s may be the same as or different from each other, in Formula (1), n1, n2, and n3 each independently represent an integer of 0 to 4, where an expression of "n1+n2+n3≥0" is satisfied in a case of "k=1", and an expression of "n1+n2+n3≥1" is satisfied in a case of "k=2", in Formula (1), m1 and m2 each independently represent 0 or 1, where m1+m2 is 1 or 2, in Formula (1), $R_4$ represents an aliphatic hydrocarbon group, an aromatic hydrocarbon group, or a heterocyclic group in a case of "m1=1", and $R_5$ represents an aliphatic hydrocarbon group, an aromatic hydrocarbon group, or a heterocyclic group in a case of "m2=1", in Formula (1), $L_1$ represents a monovalent substituent in a case of "m1=0", $L_1$ represents a divalent linking group in a case of "m1=1", $L_2$ represents a monovalent substituent in a case of "m2=0", and $L_2$ represents a divalent linking group in a case of "m2=1".

2. The liquid crystal composition according to claim 1, wherein in Formula (1), k represents 2.

3. The liquid crystal composition according to claim 1, wherein in Formula (1), $L_1$ represents a linear or branched alkylene group having 2 to 6 carbon atoms in a case of "m1=1", and $L_2$ represents a linear or branched alkylene group having 2 to 6 carbon atoms in a case of "m2=1".

4. The liquid crystal composition according to claim 1, wherein in Formula (1), $Ar_1$, $Ar_2$, and $Ar_3$ all represent a phenylene group.

5. The liquid crystal composition according to claim 1, wherein in Formula (1), $R_4$ represents an alkyl group having 1 to 6 carbon atoms in a case of "m1=1", and $R_5$ represents an alkyl group having 1 to 6 carbon atoms in a case of "m2=1".

6. The liquid crystal composition according to claim 1, wherein the liquid crystal compound is a polymer liquid crystal compound and has a crosslinkable group at a terminal.

7. The liquid crystal composition according to claim 1, further comprising:
one or more kinds of dichroic materials other than the dichroic material having a structure represented by Formula (1).

8. A dichroic material which has a structure represented by Formula (1),

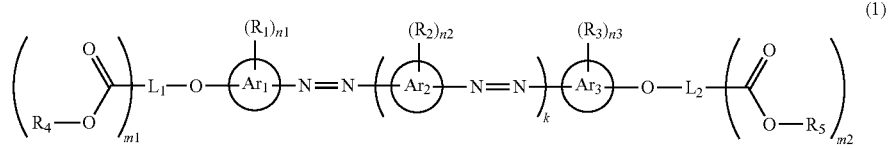

(1)

in Formula (1), $Ar_1$ represents a (n1+2)-valent aromatic hydrocarbon group or heterocyclic group, $Ar_2$ represents a (n2+2)-valent aromatic hydrocarbon group or heterocyclic group, and $Ar_3$ represents a (n3+2)-valent aromatic hydrocarbon group or heterocyclic group, in Formula (1), $R_1$, $R_2$, and $R_3$ each independently represent a monovalent substituent, a plurality of $R_1$'s may be the same as or different from each other in a case of "n1≥2", a plurality of $R_2$'s may be the same as or different from each other in a case of "n2≥2", and a plurality of $R_3$'s may be the same as or different from each other in a case of "n3≥2", in Formula (1), k represents 1 or 2, in a case of "k=2", a plurality of $Ar_2$'s may be the same as or different from each other and a plurality of $R_2$'s may be the same as or different from each other, in Formula (1), n1, n2, and n3 each independently represent an integer of 0 to 4, where an expression of "n1+n2+n3≥0" is satisfied in a case where k represents 1, and an expression of "n1+n2+n3≥1" is satisfied in a case where k represents 2, in Formula (1), m1 and m2 each independently represent 0 or 1, where m1+m2 is 1 or 2, in Formula (1), $R_4$ represents an aliphatic hydrocarbon group, an aromatic hydrocarbon group, or a heterocyclic group in a case of "m1=1", and $R_5$ represents an aliphatic hydrocarbon group, an aromatic hydrocarbon group, or a heterocyclic group in a case of "m2=1", in Formula (1), $L_1$ represents a monovalent substituent in a case of "m1=0", $L_1$ represents a divalent linking group in a case of "m1=1", $L_2$ represents a monovalent substituent in a case of "m2=0", and $L_2$ represents a divalent linking group in a case of "m2=1".

9. The dichroic material according to claim 8, wherein in Formula (1), k represents 2.

10. The dichroic material according to claim 8, wherein in Formula (1), $L_1$ represents a linear or branched alkylene group having 2 to 6 carbon atoms in a case of "m1=1", and $L_2$ represents a linear or branched alkylene group having 2 to 6 carbon atoms in a case of "m2=1".

11. The dichroic material according to claim 8, wherein in Formula (1), $Ar_1$, $Ar_2$, and $Ar_3$ all represent a phenylene group.

12. The dichroic material according to claim 8, wherein in Formula (1), $R_4$ represents an alkyl group having 1 to 6 carbon atoms in a case of "m1=1", and $R_5$ represents an alkyl group having 1 to 6 carbon atoms in a case of "m2=1".

13. A light absorption anisotropic film which is formed of the liquid crystal composition according to claim 1.

14. A laminate comprising:
a base material; and
the light absorption anisotropic film according to claim 13 formed on the base material.

15. The laminate according to claim 14, further comprising:
a λ/4 plate formed on the light absorption anisotropic film.

16. The laminate according to claim 14, further comprising:
a barrier layer formed on the light absorption anisotropic film.

17. An image display device comprising:
the light absorption anisotropic film according to claim 13.

18. An image display device comprising:
the laminate according to claim 14.

19. The liquid crystal composition according to claim 2, wherein in Formula (1), $L_1$ represents a linear alkylene group having 2 to 6 carbon atoms or a branched-alkylene group having 3 to 6 carbon atoms in a case of "m1=1", and $L_2$ represents a linear alkylene group having 2 to 6 carbon atoms or a branched alkylene-group having 3 to 6 carbon atoms in a case of "m2=1".

20. The liquid crystal composition according to claim 2, wherein in Formula (1), $Ar_1$, $Ar_2$, and $Ar_3$ all represent a phenylene group.

* * * * *